(12) United States Patent
Kim

(10) Patent No.: US 11,599,156 B2
(45) Date of Patent: Mar. 7, 2023

(54) DISPLAY DEVICE

(71) Applicant: Samsung Display Co., Ltd., Yongin-si (KR)

(72) Inventor: Jinhyoung Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 171 days.

(21) Appl. No.: 16/986,113

(22) Filed: Aug. 5, 2020

(65) Prior Publication Data
US 2021/0173450 A1   Jun. 10, 2021

(30) Foreign Application Priority Data
Dec. 9, 2019   (KR) .................. 10-2019-0162779

(51) Int. Cl.
*G06F 1/16*   (2006.01)

(52) U.S. Cl.
CPC .......... *G06F 1/1681* (2013.01); *G06F 1/1641* (2013.01)

(58) Field of Classification Search
None
See application file for complete search history.

(56) References Cited

U.S. PATENT DOCUMENTS

| | | | | |
|---|---|---|---|---|
| 9,021,657 B2 * | 5/2015 | Park | ..................... | H05K 5/0226 |
| | | | | 16/354 |
| 9,173,288 B1 * | 10/2015 | Kim | ..................... | G06F 1/1681 |
| 9,348,450 B1 * | 5/2016 | Kim | ..................... | G06F 1/1616 |
| 9,535,452 B2 * | 1/2017 | Ahn | ..................... | G06F 1/1615 |
| 9,572,272 B2 * | 2/2017 | Lee | ..................... | H05K 5/0017 |
| 9,733,668 B2 * | 8/2017 | Park | ..................... | H04B 1/385 |
| 9,801,290 B2 * | 10/2017 | Ahn | ..................... | H05K 5/0017 |
| 10,063,677 B2 * | 8/2018 | Cavallaro | ............. | G06F 1/1652 |
| 10,082,827 B2 * | 9/2018 | Yamauchi | ............. | G06F 1/1652 |
| 10,117,346 B2 * | 10/2018 | Yang | ..................... | G06F 1/1652 |
| 10,143,098 B1 * | 11/2018 | Lee | ......................... | E05D 11/06 |
| 10,274,997 B2 * | 4/2019 | Lin | ..................... | G06F 1/1616 |
| 10,306,788 B2 * | 5/2019 | Bi | .......................... | G06F 1/1681 |
| 10,416,710 B2 * | 9/2019 | Mizoguchi | ............ | G06F 1/1641 |
| 10,481,634 B2 * | 11/2019 | Mizoguchi | ............ | G06F 1/1616 |
| 10,564,682 B1 * | 2/2020 | Wu | ......................... | H05K 5/0226 |
| 10,623,537 B2 | 4/2020 | Lee et al. | | |
| 10,705,563 B2 * | 7/2020 | Lin | ..................... | G06F 1/1616 |
| 10,716,228 B2 * | 7/2020 | You | ..................... | G06F 1/1683 |
| 2007/0213000 A1 * | 9/2007 | Day | .................. | H05K 7/20754 |
| | | | | 361/695 |

(Continued)

FOREIGN PATENT DOCUMENTS

| | | |
|---|---|---|
| KR | 10-2017-0033626 | 3/2017 |
| KR | 10-1801357 | 12/2017 |

(Continued)

*Primary Examiner* — Anthony Q Edwards
*Assistant Examiner* — Rashen E Morrison
(74) *Attorney, Agent, or Firm* — H.C. Park & Associates, PLC

(57) ABSTRACT

A display device including a display module having a plurality of folding regions, a support member disposed under the display module, a plurality of hinge parts each connecting the support member, and an adjustment part controlling the folding of the folding region, in which each of the hinge parts includes a center portion having a first sub-axis and a second sub-axis and a first fixing part and a second fixing part connecting the support member and the center portion, thereby facilitating the folding of the display device.

23 Claims, 24 Drawing Sheets

(56) References Cited

U.S. PATENT DOCUMENTS

| | | | |
|---|---|---|---|
| 2011/0043976 A1* | 2/2011 | Visser | G09F 9/301 |
| | | | 361/679.01 |
| 2011/0063783 A1* | 3/2011 | Shim | G06F 1/1615 |
| | | | 361/679.01 |
| 2011/0316337 A1* | 12/2011 | Pelio | H05K 7/1492 |
| | | | 307/24 |
| 2012/0092811 A1* | 4/2012 | Chapel | G05F 1/66 |
| | | | 361/622 |
| 2012/0120618 A1* | 5/2012 | Bohn | G06F 1/1618 |
| | | | 361/679.01 |
| 2012/0264489 A1 | 10/2012 | Choi et al. | |
| 2013/0021762 A1* | 1/2013 | van Dijk | H05K 5/0226 |
| | | | 361/749 |
| 2015/0089974 A1* | 4/2015 | Seo | A44C 5/0076 |
| | | | 63/1.13 |
| 2016/0021793 A1* | 1/2016 | Chen | H05K 7/202 |
| | | | 361/679.02 |
| 2017/0013745 A1* | 1/2017 | Wilcox | H05K 7/20745 |
| 2017/0060188 A1* | 3/2017 | Han | G06F 1/1641 |
| 2017/0061836 A1* | 3/2017 | Kim | G06F 1/1626 |
| 2017/0359917 A1* | 12/2017 | Bailey | H05K 7/1485 |
| 2018/0275725 A1* | 9/2018 | Lin | G06F 1/1616 |
| 2019/0132975 A1 | 5/2019 | Kim et al. | |
| 2019/0171799 A1* | 6/2019 | Crawford | G06F 21/31 |
| 2019/0261534 A1* | 8/2019 | Jochim | H05K 7/20781 |
| 2020/0146186 A1* | 5/2020 | Fotouh | E04B 2/7401 |
| 2020/0257335 A1* | 8/2020 | Kim | G06F 1/1616 |
| 2020/0329569 A1 | 10/2020 | Kim et al. | |
| 2021/0076529 A1* | 3/2021 | Pachoud | H04L 41/24 |
| 2021/0219460 A1* | 7/2021 | Bailey | H05K 7/1481 |

FOREIGN PATENT DOCUMENTS

| | | |
|---|---|---|
| KR | 10-1839615 | 3/2018 |
| KR | 10-2019-0048384 | 5/2019 |
| KR | 10-1986762 | 6/2019 |

\* cited by examiner

DISPLAY DEVICE

CROSS REFERENCE TO RELATED APPLICATION

This application claims priority from and the benefit of Korean Patent Application No. 10-2019-0162779, filed on Dec. 9, 2019, which is hereby incorporated by reference for all purposes as if fully set forth herein.

BACKGROUND

Field

Exemplary embodiments of the invention relate generally to a display device, and, more specifically, to a flexible display device including a foldable display device including a plurality of hinge parts.

Discussion of the Background

With the technology development of display devices, display devices are recently being developed in various shapes. For example, various flexible display devices that may be deformed, folded, or rolled into a curved-surface shape have been developed. Flexible display devices that can be deformed into various shapes improve portability and user convenience.

Among the flexible display devices, a foldable display device generally includes a display module, which is foldable on the basis of a folding region extending in one direction. Recently, research has been conducted on the structure of display devices in order to control folding in various manners.

The above information disclosed in this Background section is only for understanding of the background of the inventive concepts, and, therefore, it may contain information that does not constitute prior art.

SUMMARY

Display devices constructed according to exemplary embodiments of the invention are capable of being easily folded in various shapes.

Additional features of the inventive concepts will be set forth in the description which follows, and in part will be apparent from the description, or may be learned by practice of the inventive concepts.

A display device according to an exemplary embodiment includes: a display module including a first folding region, a first non-folding region adjacent to one side of the first folding region, and a second non-folding region adjacent to the other side of the first folding region; a support member disposed under the display module and including a first folding support part corresponding to the first folding region, a first non-folding support part corresponding to the first non-folding region, and a second non-folding support part corresponding to the second non-folding region; a first hinge part connecting the first folding support part and the second non-folding support part; a second hinge part connecting the first folding support part and the first non-folding support part; and a first adjustment part disposed between the first folding region and the first non-folding region, or between the first folding region and the second non-folding region to control folding of the first folding region, in which each of the first hinge part and the second hinge part includes: a center portion having a first sub-axis and a second sub-axis extending in a first direction; a first fixing part connecting the center portion and the first folding support part; and a second fixing part connecting the center portion and the first non-folding support part or connecting the center portion and the second non-folding support part.

With respect to a virtual center line passing through the center of the second non-folding support part and parallel to the first direction, a distance D1 from the virtual center line to the first hinge part may be shorter than a distance D2 from the virtual center line to the second hinge part.

The first adjustment part may be disposed between the first folding region and the first non-folding region, and the first adjustment part may be disposed inside the center portion of the second hinge part or under the second hinge part.

The display module and the support member may be configured to be folded such that the first non-folding region and the second non-folding region overlap in a first mode, and may be configured to be unfolded such that the first non-folding region, the first folding region, and the second non-folding region are disposed in parallel in a second mode.

The first adjustment part may connect the first sub-axis and the second sub-axis of the second hinge part, and the length of the first adjustment part in the first mode may be greater than the length of the first adjustment part in the second mode.

The first adjustment part may include an elastic body.

The first adjustment part may be disposed under the center portion of the second hinge part, and the length of the first adjustment part in the first mode may be greater than the length of the first adjustment part in the second mode.

The first adjustment part may include an elastic body.

The first adjustment part may be disposed between the first folding region and the first non-folding region, the first adjustment part may include a first sub-electromagnet attached to the first folding support part side and a second sub-electromagnet attached to the first non-folding support part side, and the first sub-electromagnet and the second sub-electromagnet may be configured to be spaced apart from each other in the first mode, and the first sub-electromagnet and the second sub-electromagnet are configured to be coupled to each other in the second mode.

The first hinge part may include a first sub-hinge part and a second sub-hinge part spaced apart from each other in the first direction, and the second hinge part may include a third sub-hinge part and a fourth sub-hinge part spaced apart from each other in the first direction, a first opening may be defined between the first sub-hinge part and the second hinge part, and a second opening may be defined between the third sub-hinge part and the fourth sub-hinge part; and the first adjustment part may be disposed in the second opening.

The display module may further include a second folding region adjacent to the second non-folding region, and a third non-folding region adjacent to the second folding region and spaced apart from the second non-folding region; the support member may further include a third non-folding support part corresponding to the third non-folding region and a second folding support part corresponding to the second folding region; and the display device may further include a second adjustment part disposed between the second folding region and the third non-folding region to control the folding of the second folding region.

The display device may further include a third hinge part connecting the second folding support part and the second non-folding support part, and a fourth hinge part connecting the second folding support part and the third non-folding support part, in which each of the third hinge part and the fourth hinge part may include a center portion having a first sub-axis and a second sub-axis extending in the first direction, a first fixing part connecting the center portion and the second folding support part, and a second fixing part connecting the center portion and the third non-folding support part.

The first adjustment part may be disposed adjacent to the second hinge part, and the second adjustment part may be disposed adjacent to the fourth hinge part.

The display module and the support member may be configured to be folded such that the first non-folding region, the second non-folding region, and the third non-folding region overlap in a third mode, and may be configured to be unfolded such that the first non-folding region, the second non-folding region, and the third non-folding region are disposed in parallel in a fourth mode.

Each of the first adjustment part and the second adjustment part may include an elastic body, the length of the second adjustment part may be greater than the length of the first adjustment part when the second non-folding region, the first non-folding region, and the third non-folding region sequentially overlap each other, and the length of the first adjustment part may be greater than the length of the second adjustment part when the second non-folding region, the third non-folding region, and the first non-folding region sequentially overlap each other.

The first adjustment part may include a first sub-electromagnet attached to the first folding support part, and a second sub-electromagnet attached to the first non-folding support part and facing the first sub-electromagnet, the second adjustment part may include a third sub-electromagnet attached to the second folding support part and a fourth sub-electromagnet attached to the third non-folding support part and facing the third sub-electromagnet, and the first sub-electromagnet and the second sub-electromagnet may be configured to be coupled to each other, and the third sub-electromagnet and the fourth sub-electromagnet may be configured to be spaced apart from each other when the second non-folding region, the first non-folding region, and the third non-folding region are sequentially overlapped, and the first sub-electromagnet and the second sub-electromagnet may be configured to be spaced apart from each other, and the third sub-electromagnet and the fourth sub-electromagnet may be configured to be coupled to each other when the second non-folding region, the third non-folding region, and the first non-folding region are sequentially overlapped.

A display device according to another exemplary embodiment includes: a display module including a first non-folding region, a second non-folding region, and a third non-folding region spaced apart from each other on a plane, a first folding region disposed between the first non-folding region and the second non-folding region, and a second folding region disposed between the second non-folding region and the third non-folding region; a support member disposed under the display module, and including a first non-folding support part corresponding to the first non-folding region, a second non-folding support part corresponding to the second non-folding region, a third non-folding support part corresponding to the third non-folding region, a first folding support part corresponding to the first folding region, and a second folding support part corresponding to the second folding region; a first hinge part connecting the second non-folding support part and the first folding support part; a second hinge part connecting the first folding support part and the first non-folding support part; a third hinge part connecting the second non-folding support part and the second folding support part; a fourth hinge part connecting the second folding support part and the third non-folding support part; a first adjustment part disposed between the first folding region and the first non-folding region; and a second adjustment part disposed between the second folding region and the third non-folding region, in which a first state of the first adjustment part and a second state of the second adjustment part are configured to be different from each other when the display module and the support member are folded such that the first non-folding region, the second non-folding region, and the third non-folding region overlap each other.

Each of the first adjustment part and the second adjustment part may include an elastic body.

The length of the second adjustment part may be greater than the length of the first adjustment part when the second non-folding region, the first non-folding region, and the third non-folding region sequentially overlap each other, and the length of the first adjustment part may be greater than the length of the second adjustment part when the second non-folding region, the third non-folding region, and the first non-folding region sequentially overlap each other.

When the second non-folding region, the first non-folding region, and the third non-folding region sequentially overlap each other, the first hinge part, the third hinge part, and the fourth hinge part may be configured to be sequentially folded, and the length of the second adjustment part may be greater than the length of the first adjustment part.

The first adjustment part may include a first sub-electromagnet attached to the first folding support part, and a second sub-electromagnet attached to the first non-folding support part and facing the first sub-electromagnet; the second adjustment part may include a third sub-electromagnet attached to the second folding support part, and a fourth sub-electromagnet attached to the third non-folding support part and facing the third sub-electromagnet; and the first sub-electromagnet and the second sub-electromagnet may be configured to be coupled to each other, and the third sub-electromagnet and the fourth sub-electromagnet may be configured to be spaced apart from each other when the second non-folding region, the first non-folding region, and the third non-folding region are sequentially overlapped; and the first sub-electromagnet and the second sub-electromagnet may be configured to be spaced apart from each other, and the third sub-electromagnet and the fourth sub-electromagnet may be configured to be coupled to each other when the second non-folding region, the third non-folding region, and the first non-folding region are sequentially overlapped.

When the second non-folding region, the first non-folding region, and the third non-folding region sequentially overlap each other: the first hinge part, the third hinge part, and the fourth hinge part may be configured to be sequentially folded, and the first sub-electromagnet and the second sub-electromagnet may be configured to be coupled to each other, and the third sub-electromagnet and the fourth sub-electromagnet are configured to be spaced apart from each other.

When the second non-folding region, the third non-folding region, and the first non-folding region sequentially overlap each other, the third hinge part, the first hinge part, and the second hinge part may be configured to be sequentially folded, and the first sub-electromagnet and the second sub-electromagnet may be configured to be spaced apart from each other; and the third sub-electromagnet and the fourth sub-electromagnet are configured to be coupled to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
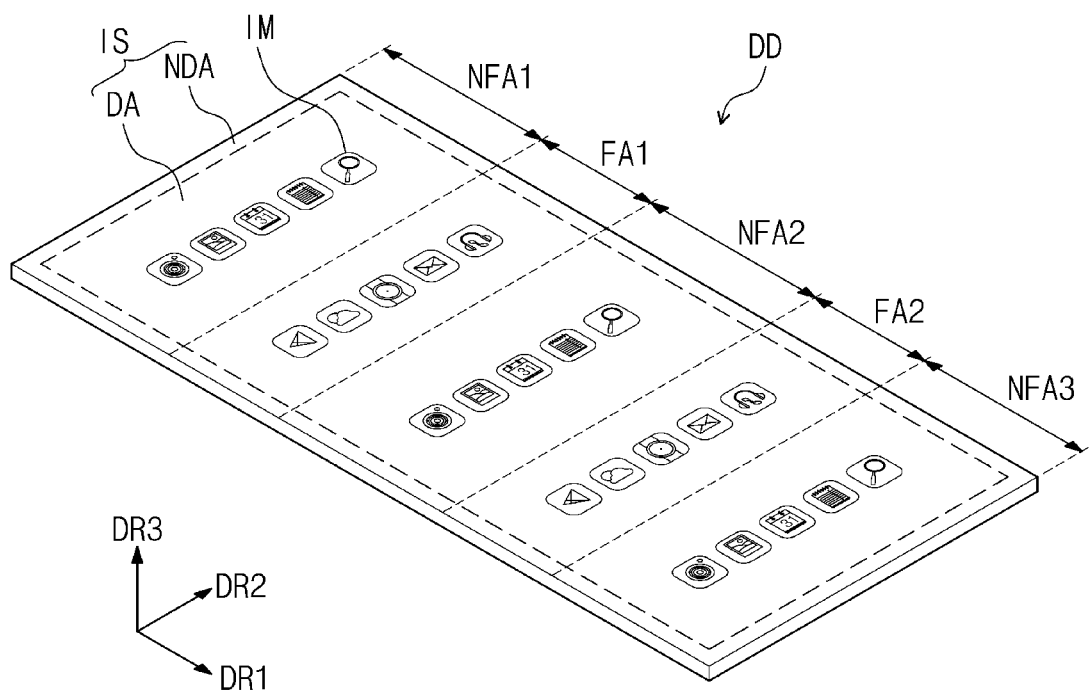
FIG. 1 is a perspective view showing a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
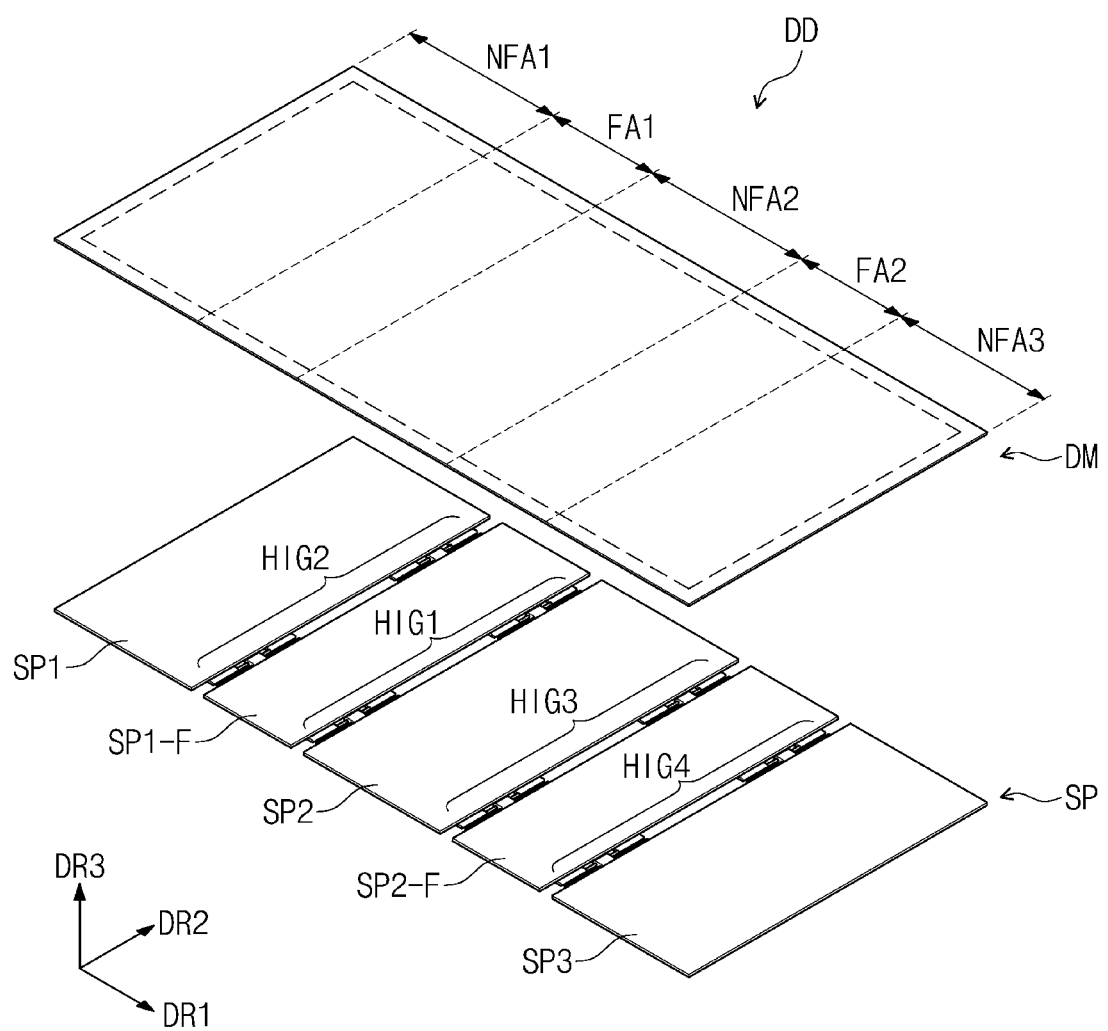
FIG. 2 is an exploded perspective view showing a portion of a display device according to an exemplary embodiment.
Figure 3:
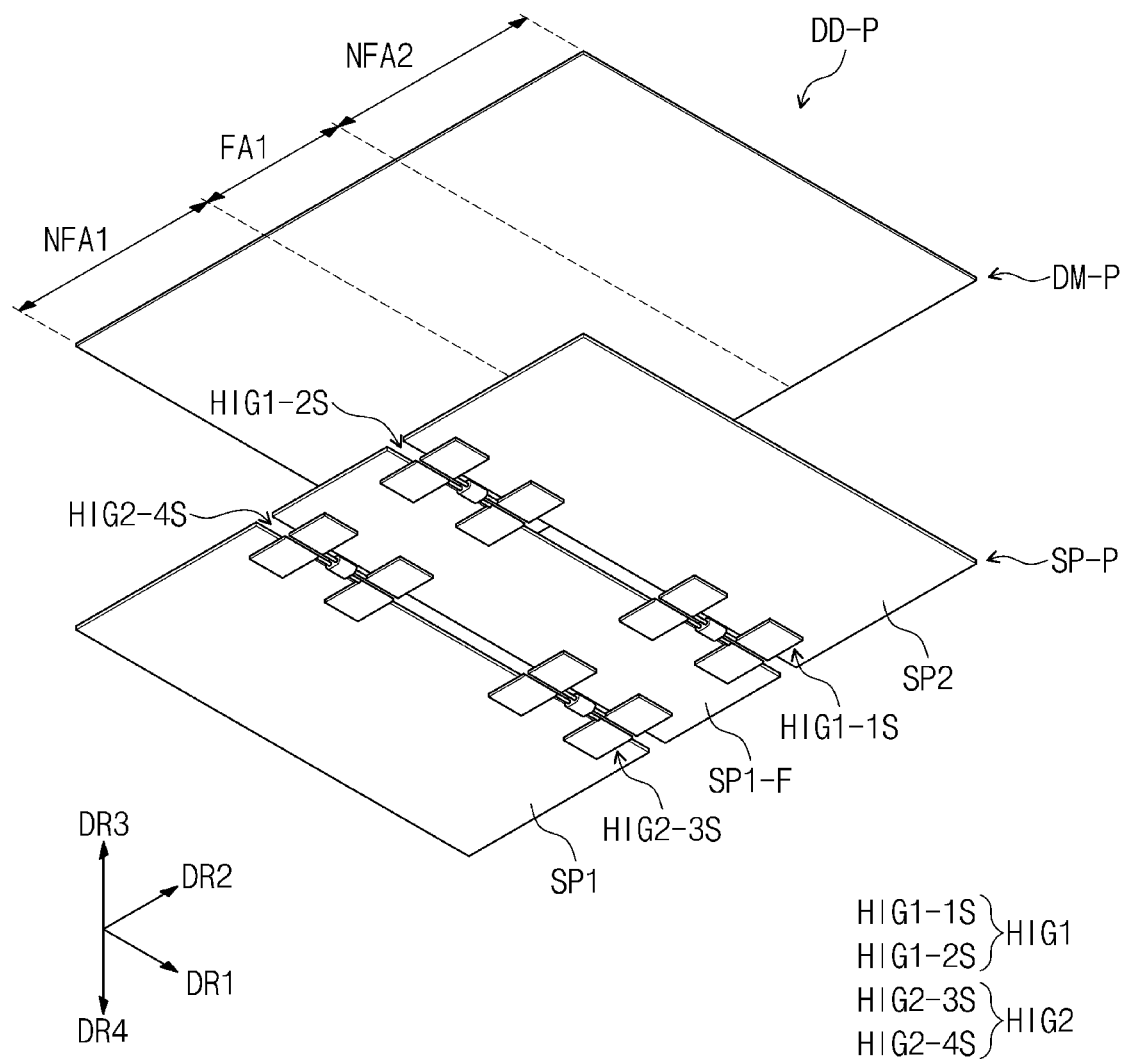
FIG. 3 is an exploded perspective view showing a portion of a display device according to an exemplary embodiment.
Figure 4:
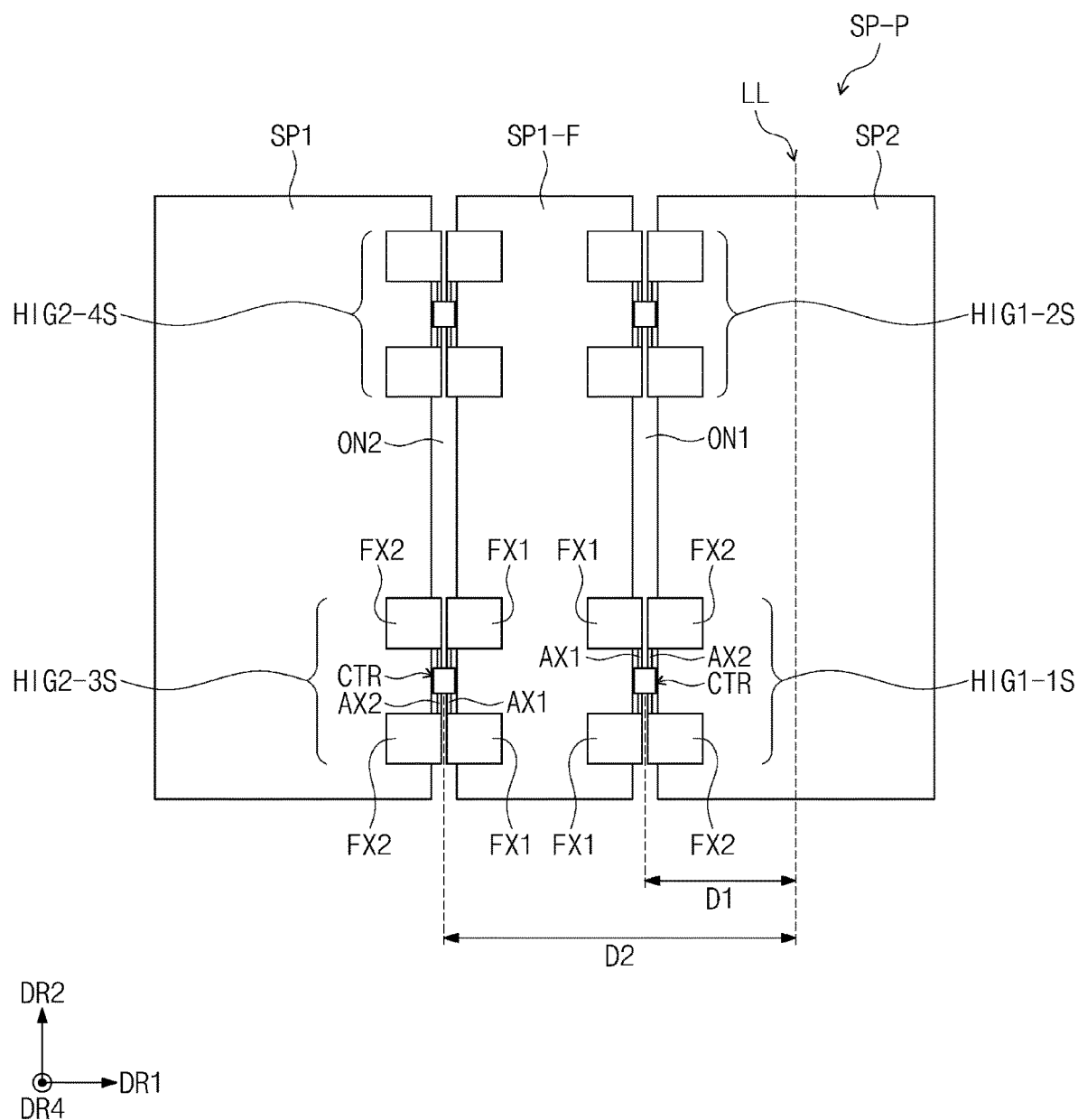
FIG. 4 is a plan view showing a portion of a display device according to an exemplary embodiment.
Figure 5:
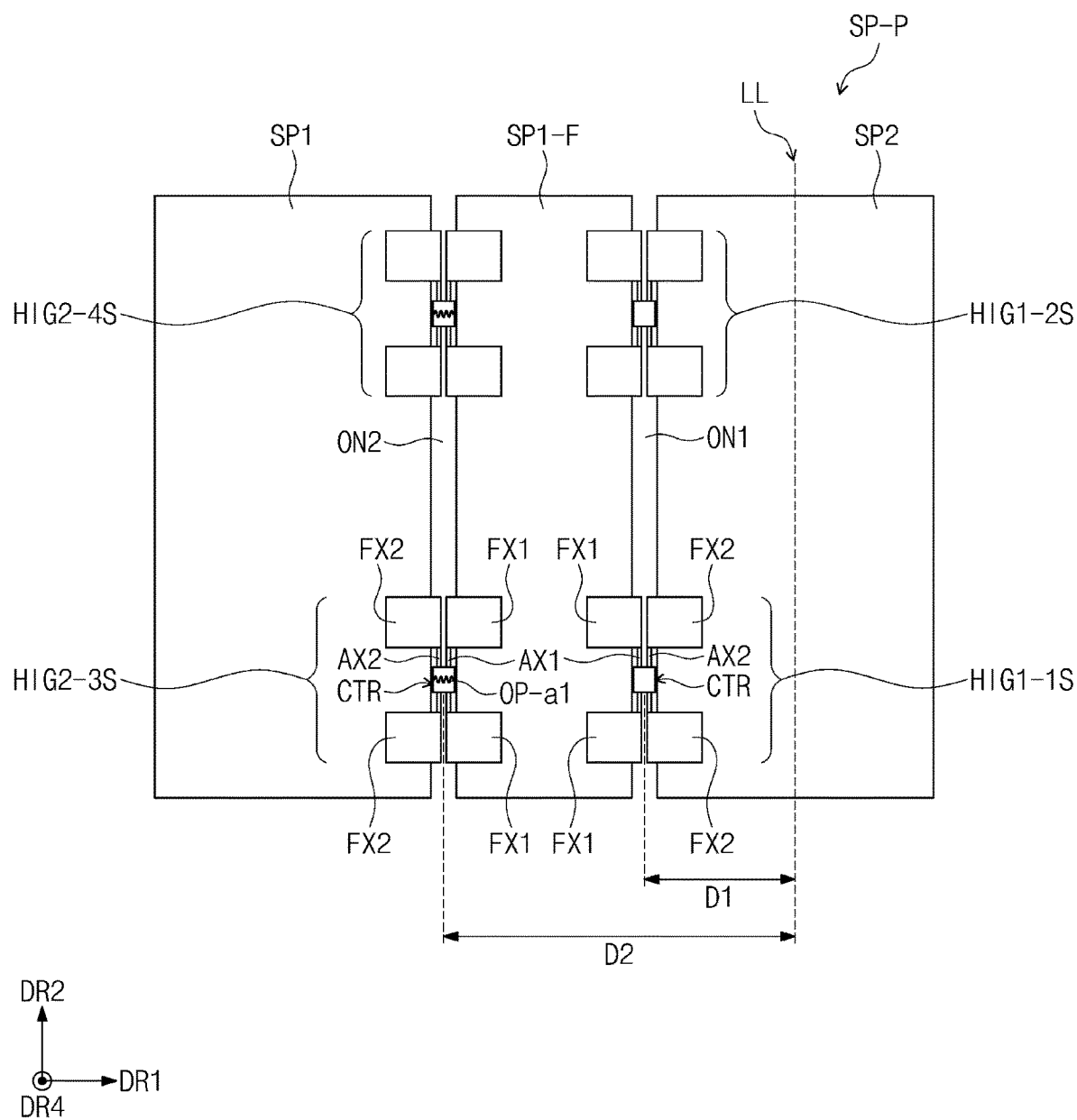
FIG. 5 is a plan view showing a portion of a display device according to an exemplary embodiment.
Figure 6:
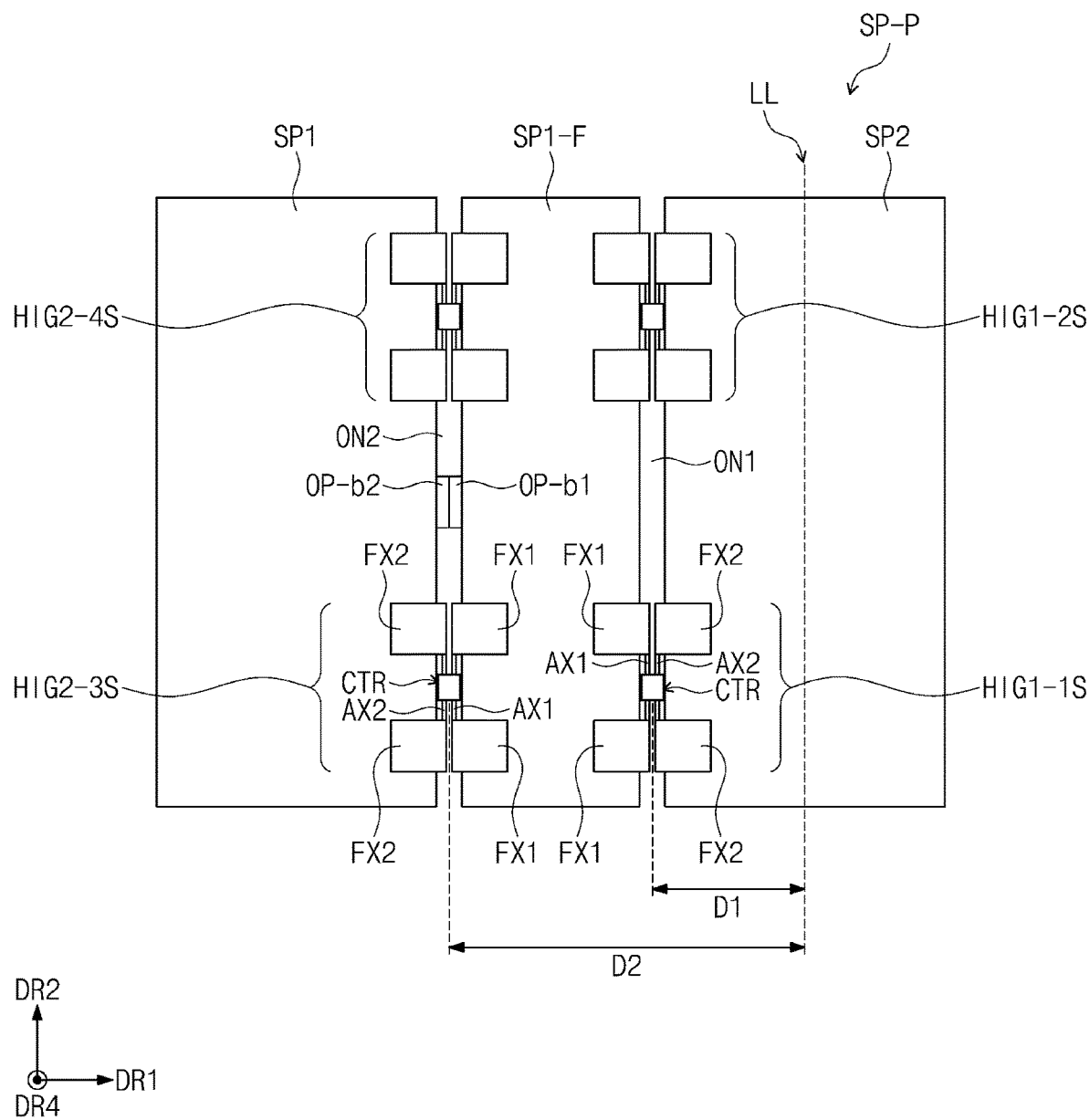
FIG. 6 is a perspective view showing a portion of a display device according to an exemplary embodiment.
Figure 7:
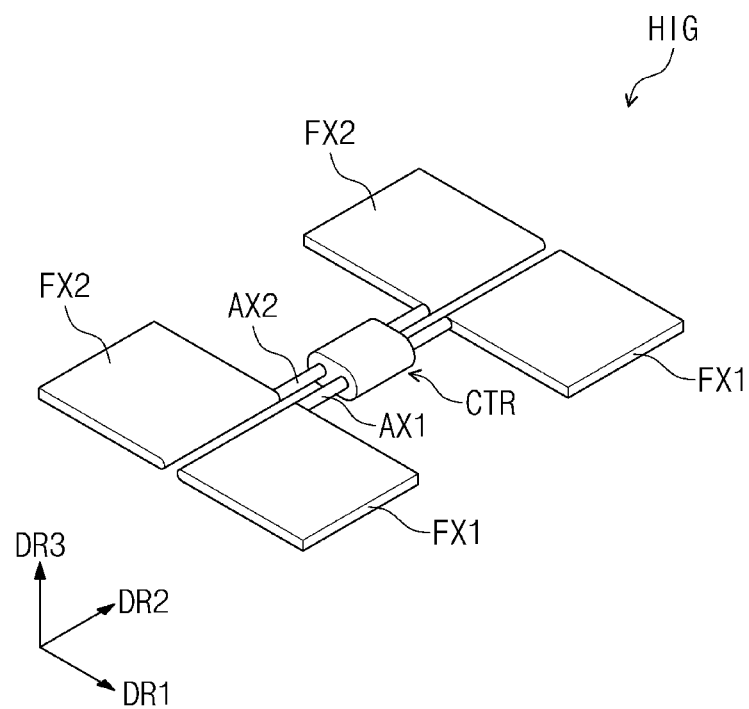
FIG. 7 is a perspective view showing a hinge part according to an exemplary embodiment.
Figure 8:
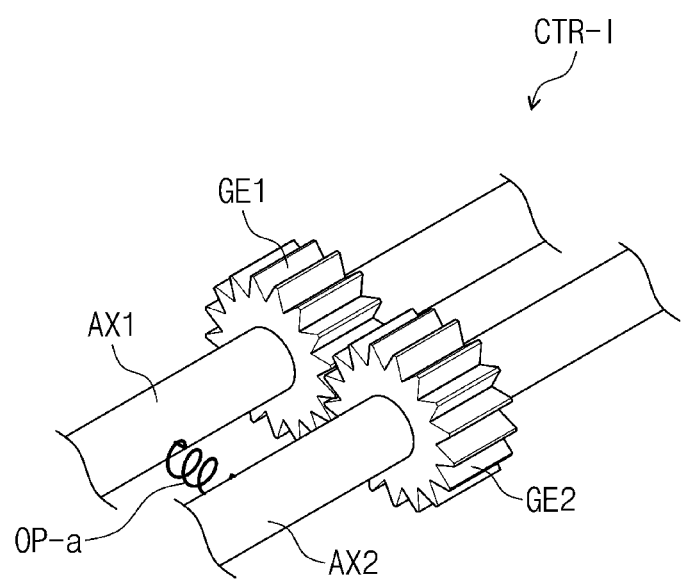
FIG. 8 is a perspective view showing a portion of a hinge part according to an exemplary embodiment.

FIG. 1 is a perspective view showing a display device DD according to an exemplary embodiment. FIG. 2 and FIG. 3 are exploded perspective views of the display device DD according to an exemplary embodiment. FIG. 4 to FIG. 6 are plan views showing a portion of a support member SP according to an exemplary embodiment. FIG. 7 and FIG. 8 are perspective views of a hinge part HIG according to an exemplary embodiment. FIG. 9 to FIG. 14 are cross-sectional views showing a portion of a display device according to an exemplary embodiment.

In FIG. 1, the display device DD is exemplarily illustrated as a portable electronic apparatus. However, the inventive concepts are not limited thereto. For example, in some exemplary embodiments, the display device DD may be used in large electronic devices, such as television, monitors, or external advertisement boards, and also be used in small and medium-sized electronic devices, such as personal computers, notebook computers, personal digital terminals, car navigation system units, game machines, smart phones, tablets, and cameras. However, these are merely exemplary, and the display device DD may be employed in various other electronic devices.

Referring to FIG. 1, the display device DD may display an image IM through a display surface IS. The display surface IS includes a display region DA in which the image IM is displayed, and a non-display region NDA adjacent to the display region DA. The non-display region NDA is a region in which an image is not displayed.

The display region DA may have substantially a quadrangular shape. The non-display region NDA may surround the display region DA. However, the inventive concepts are not limited thereto. For example, the shape of the display region DA and the shape of the non-display region NDA may be correlatively designed. In some exemplary embodiments, the non-display region NDA may not be formed on a front surface of the display device DD.

The display device DD according to an exemplary embodiment may include a plurality of non-folding regions and at least one folding region. Referring to FIG. 1, the display device DD according to the illustrated exemplary embodiment includes two separate folding regions FA1 and FA2 spaced apart from each other, and three non-folding regions NFA1, NFA2, and NFA3 spaced apart from each other. However, the inventive concepts are not limited thereto. In another exemplary embodiment, a display device may include one folding region and non-folding regions respectively disposed on both sides of the folding region. In some exemplary embodiments, three or more folding regions and four or more non-folding regions may be formed.

Referring to FIG. 3, the display device DD-P according to an exemplary embodiment may include a display module DM-P and a support member SP-P disposed under the display module DM. The display module DM may include a first non-folding region NFA1, a second non-folding region NFA2, and a first folding region FA1. The first non-folding region NFA1 and the second non-folding region NFA2 may be respectively disposed adjacent to both sides of the first folding region FA1.

The support member SP-P includes a first non-folding support part SP1, a second non-folding support part SP2, and a first folding support part SP1-F. The first non-folding support part SP1 and the second non-folding support part SP2 are portions respectively corresponding to the first non-folding region NFA1 and the second non-folding region NFA2, and the first folding support part SP1-F is a portion corresponds to the first folding region FA1.

Referring to FIG. 1 to FIG. 8, the display device DD (or DD-P) may include a first hinge part HIG1, a second hinge part HIG2, and first adjustment parts OP-a, OP-a1, Op-b1, and OP-b2 for controlling the folding of the first folding region FA1.

A support member SP-P according to an exemplary embodiment may correspond to the non-folding regions NFA1 and NFA2 and the folding region FA1 of a display module DM-P. In particular, the support member SP-P may include the first non-folding support part SP1 and the second non-folding support part SP2 corresponding to the non-folding regions NFA1 and NFA2, and the first folding support part SP1-F corresponding to the first folding area FA1.

According to an exemplary embodiment, the first adjustment parts OP-a, OP-a1, OP-b1, and OP-b2 may be disposed between the first folding region FA1 and the first non-folding region NFA1, or between the first folding region FA1 and the second non-folding region NFA2, to control the folding of the first folding region FA1.

The first hinge part HIG1 may connect the first folding support part SP1-F and the second non-folding support part SP2, and the second hinge part HIG2 may connect the first folding support part SP1-F and the first non-folding support part SP1. Also, each of the first hinge part HIG1 and the second hinge part HIG2 may include a center portion CTR, a first fixing part FX1, and a second fixing part FX2. The center portion CTR included in each of the first hinge part HIG1 and the second hinge part HIG2 may include a first sub-axis AX1 and a second sub-axis AX2. The first fixing part FX1 may be connected to the center portion CTR and coupled to the first folding support part SP1-F, and the second fixing part FX2 may be connected to the center portion CTR and coupled to the first non-folding support part SP1 or the second non-folding support part SP2.

Referring to FIG. 2, in the display device DD according to an exemplary embodiment, the display device DD may further include a second folding region FA2 and the third non-folding region NFA3 as compared to the display device DD-P shown in FIG. 3. The first non-folding region NFA1, the second non-folding region NFA2, and the third non-folding region NFA3 may be spaced apart from each other, the first folding region FA1 may be disposed between the first non-folding region NFA1 and the second non-folding region NFA2. The second folding region FA2 may be disposed between the second non-folding region NFA2 and the third non-folding region NFA3. More particularly, the non-folding region NFA1, the first folding region FA1, the second non-folding region NFA2, the second non-folding region FA2, and the third non-folding region NFA3 may be disposed along an extending direction of a first direction axis DR1 on a plane.

The support member SP may further include a second folding support part SP2-F and a third non-folding support part SP3. The third non-folding support part SP3 is spaced apart from the second non-folding support part SP2, and the second folding support part SP2-F may be disposed between the second non-folding support part SP2 and the third non-folding support part SP3. More particularly, the first non-folding support part SP1, the first folding support part SP1-F, the second non-folding support part SP2, the second folding support part SP2-F, and the third non-folding support part SP3 may be disposed along the extending direction of the first direction axis DR1 on a plane.

The first non-folding support part SP1 included in the support member SP may correspond to the first non-folding region NFA1, and the second non-folding support part SP2 may correspond to the second non-folding region NFA2, and the first folding support part SP1-F may correspond to the first folding region FA1. In particularly, on both sides of the first folding support part SP1-F, the first non-folding support part SP1 and the second non-folding support part SP2 may be disposed.

In addition, the second folding support part SP2-F may correspond to the second folding region FA2, and the third non-folding support part SP3 may correspond to the third non-folding region NFA3. The second folding support part SP2-F may be disposed between the second non-folding support part SP2 and the third non-folding support part SP3.

Components of the support member SP may be connected by the first hinge part HIG1 to the fourth hinge part HIG4. The first hinge part HIG1 may connect the second non-folding support part SP2 and the first folding support part SP1-F, and the second hinge part HIG2 may connect the first folding support part SP1-F and the first non-folding support part SP1. The third hinge part HIG3 may connect the second non-folding support part SP2 and the second folding support part SP2-F, and the fourth hinge part HIG4 may connect the second folding support part SP2-F and the third non-folding support part SP3.

The support member SP may be attached to the display module DM using an adhesive. The adhesive may include a pressure sensitive adhesive, without being limited thereto. The adhesive may include various adhesives in addition to a pressure sensitive adhesive.

Referring to FIG. 3, the first hinge part HIG1 and the second hinge part HIG2 may connect components of the support member SP-P. Unlike FIG. 2, the display module DM-P is illustrated as including two non-folding regions NFA1 and NFA2 and one folding region FA1, and the support member SP-P are illustrated as including two non-folding support parts SP1 and SP2 and one folding support part SP1-F.

According to an exemplary embodiment, first hinge parts HIG1 may include a first sub-hinge part HIG1-1S and a second sub-hinge part HIG1-2S spaced apart from each other, and may connect the folding support part SP1-F and the second non-folding support part SP2. The first sub-hinge part HIG1-1S and the second sub-hinge part HIG1-2S may be extended in one direction. Referring to FIG. 4 to FIG. 6 to be described later, the first sub-hinge part HIG1-1S and the second sub-hinge part HIG1-2S may be disposed parallel to each other along an extending direction of a second direction axis DR2. Also, second hinge parts HIG2 may include a third sub-hinge part HIG2-3S and a fourth sub-hinge part HIG2-4S spaced apart from each other, and may connect the first folding support part SP1-F and the first non-folding support part SP1. The third sub-hinge part HIG2-3S and the fourth sub-hinge part HIG2-4S may be disposed parallel to each other along an extending direction of the second direction axis DR2. However, the inventive concepts are not limited thereto, and the number of sub-hinge parts may vary. For example, the number of sub-hinge parts included in one hinge part may be 1. As another example, the number of sub-hinge parts included in one hinge part may be 3 or more.

FIG. 4 to FIG. 6 are plan views showing a portion of a display device including the support member SP-P and the hinge parts HIG1-1S, HIG1-2S, HIG2-3S, and HIG2-4S connecting the support member SP-P. FIG. 7 is a perspective view showing the hinge part HIG according to an exemplary embodiment. FIG. 8 is a perspective view showing the inside CTR-I of a center portion included in the second hinge parts HIG2-3S and HIG2-4S of FIG. 4.

The support members SP1, SP1-F, and SP2 included in the support member SP-P may be connected by the plurality of hinge parts HIG1-1S, HIG1-2S, HIG2-3S, and HIG2-4S.

The first hinge parts HIG1-1S and HIG1-2S may connect the first folding support part SP1-F and the second non-folding support part SP2, and the second hinge parts HIG2-3S and HIG2-4S may connect the first folding support part SP1-F and the first non-folding support part SP1. The plurality of hinge parts HIG1-1S, HIG1-2S, HIG2-3S, and HIG2-4S may be disposed on both sides of the first folding support part SP1-F and connect the non-folding support parts SP1 and SP2 and the first folding support part SP1-F.

The first sub-hinge part HIG1-1S and the second sub-hinge part HIG1-2S may be disposed between the first folding support part SP1-F and the second non-folding support part SP2, and connect the first folding support part SP1-F and the second non-folding support part SP2. The third sub-hinge part HIG2-3S and the fourth sub-hinge part HIG2-4S may be disposed between the first folding support part SP1-F and the first non-folding support part SP1, and connect the first folding support part SP1-F and the first non-folding support part SP1.

Each of the first hinge parts HIG1-1S and HIG1-2S and each of the second hinge parts HIG2-3S and HIG2-4S may include the center portion CTR, the first fixing part FX1, and the second fixing part FX2. The center portion CTR includes the first sub-axis AX1 and the second sub-axis AX2. The first sub-axis AX1 and the second sub-axis AX2 may be extended in one direction. Referring to FIG. 7, the one direction in which the first sub-axis AX1 and the second sub-axis AX2 are extended may be a direction in which the second direction axis DR2 is extended. The first sub-axis AX1 and the second sub-axis AX2 may be rotatable.

For example, the first sub-axis AX1 and the second sub-axis AX2 may be respectively coupled to gears GE1 and GE2, which rotate while being engaged therewith. When the first sub-axis AX1 and the second sub-axis AX2 rotate, the gears GE1 and GE2 respectively coupled to the first sub-axis AX1 and the second sub-axis AX2 may rotate while being engaged thereto. However, the inventive concepts are not limited thereto.

The sub-axis AX1 may be connected to the first fixing part FX1 side, and the second sub-axis AX2 may be connected to the second fixing part FX2 side. The first fixing part FX1 may be coupled to the first folding support part SP1-F and the second fixing part FX2 may be respectively coupled to the first non-folding support part SP1 and the second non-folding support part SP2.

Referring to FIG. 4 to FIG. 6, a distance D2 to the center portion CTR included in the third sub-hinge part HIG2-3S based on a virtual center line LL is illustrated as being greater than a distance D1 to the center portion CTR included in the first sub-hinge part HIG1-1S, based on the virtual center line LL passing through a plane phase of the second non-folding support part SP2. The center line LL passes through the center of the second non-folding support part SP2 on a plane, and may be a virtual line parallel to the extending direction of the second direction axis DR2.

When the length of the D2 is greater than the length of the D1, the second hinge parts HIG2-3S and HIG2-4S may be disposed on an outer side than the first hinge parts HIG1-1S and HIG1-2S with respect to the second non-folding support part SP2. That is, the first hinge parts HIG1-1S and HIG1-2S may be disposed more adjacent to the second non-folding support part SP2 than the second hinge parts HIG2-3S and HIG2-4S.

The adjustment parts OP-a, OP-a1, OP-b1, and OP-b2 may be disposed adjacent to any one of the first hinge parts HIG1-1S and HIG1-2S and the second hinge parts HIG2-3S and HIG2-4S. For example, according to one exemplary embodiment, the adjustment parts OP-a, OP-a1, OP-b1, and OP-b2 may be disposed adjacent to the second hinge parts HIG2-3S and HIG2-4S.

The adjustment parts OP-a, OP-a1, OP-b1, and OP-b2 may be included inside the second hinge parts HIG2-3S and HIG2-4S, or may be provided as a separate component from the hinge parts HIG2-3S and HIG2-4S. However, the inventive concepts are not limited thereto.

FIG. 8 is a perspective view showing the inside CTR-I of a center portion included in a hinge part HIG according to an exemplary embodiment. Referring to FIG. 8, the adjustment part OP-a may be disposed the inside CTR-I the center portion. The adjustment part OP-a is disposed adjacent to each of the gears GE1 and GE2, and may connect the sub-axes AX1 and AX2 to each other.

According to an exemplary embodiment, the adjustment parts OP-1 and OP-a1 may be elastic bodies. For example, the adjustment parts OP-a and OP-a1 may be springs or rubber bands, and the state thereof may change according to the movement of the adjustment parts OP-a and OP-a1. Meanwhile, the adjustment parts OP-b1, OP-b2, OP-b3, and OP-b4 may be sub-electromagnets (see FIG. 24), and may be spaced apart from each other or coupled to each other according to the movement of the adjustment parts OP-b1, OP-b2, OP-b3, and Op-b4. However, the inventive concepts are not limited thereto.

In FIG. 5, the first adjustment part OP-a1 is illustrated as being disposed under the second hinge part HIG2-3S and HIG2-4S. In FIG. 6, in an exemplary embodiment, the first adjustment parts OP-b1 and OP-b2 may be disposed between the third sub-hinge part HIG2-3S and the fourth sub-hinge part HIG2-4S.

Figure 9:
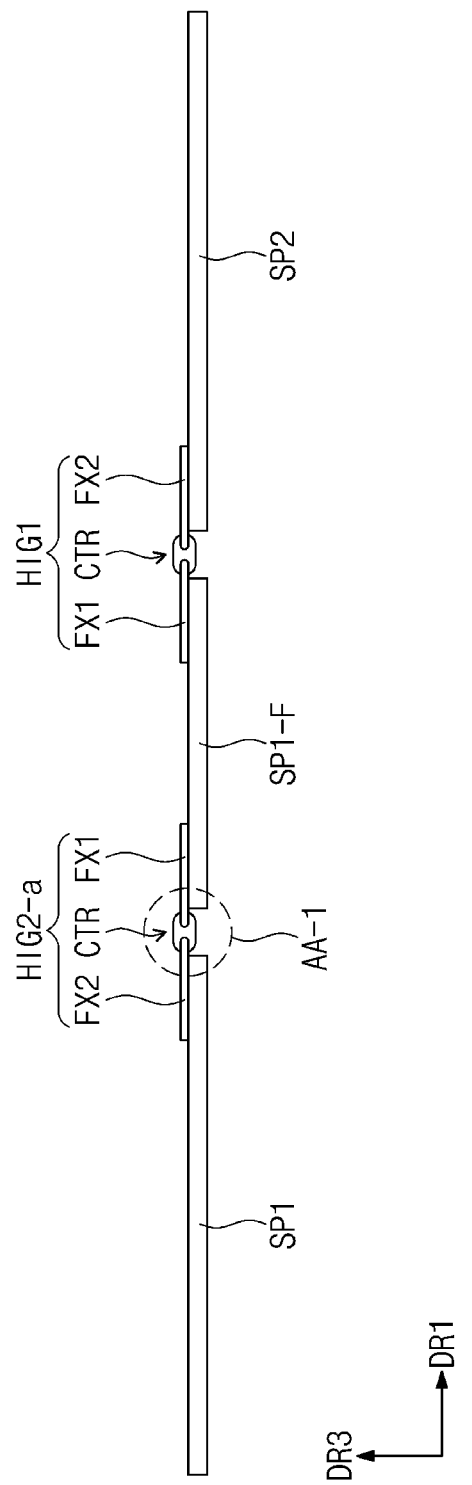
FIG. 9 is a cross-sectional view showing a portion of a display device according to an exemplary embodiment.
Figure 10:
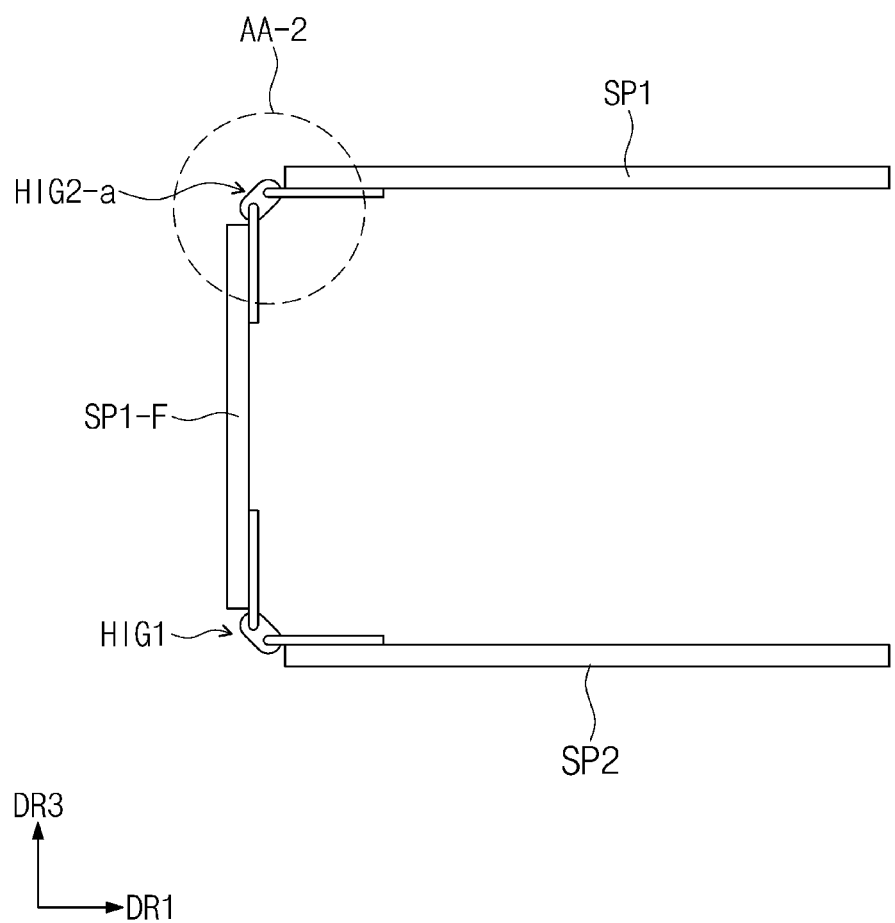
FIG. 10 is a cross-sectional view showing a portion of a display device according to an exemplary embodiment.
Figure 11:
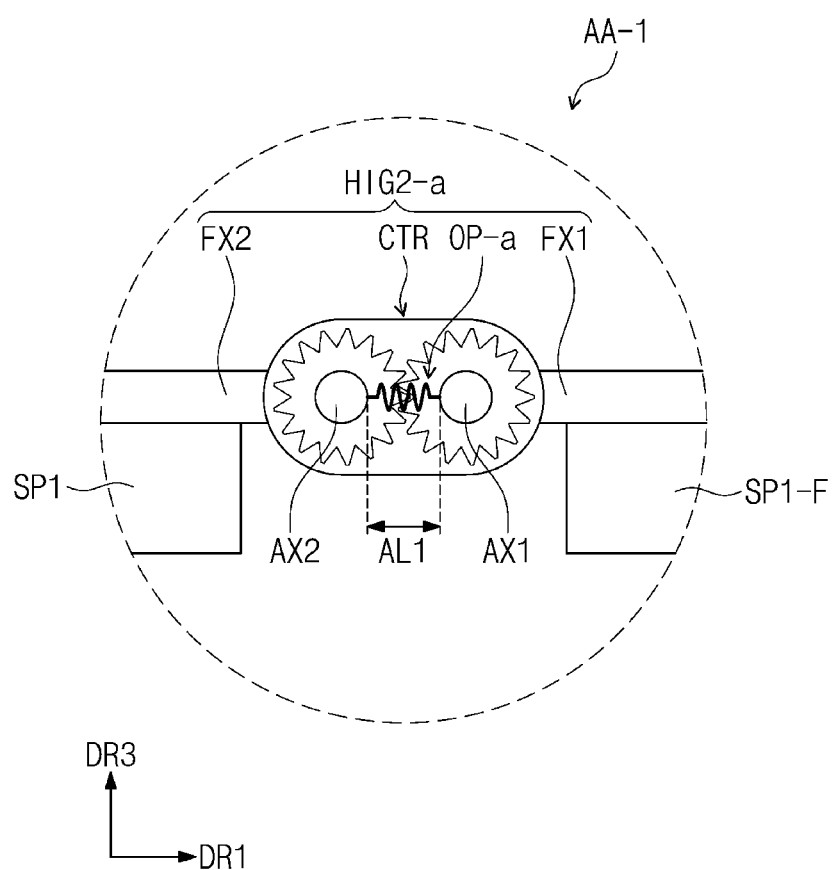
FIG. 11 is a cross-sectional view showing a portion corresponding to region AA-1 of FIG. 9.
Figure 12:
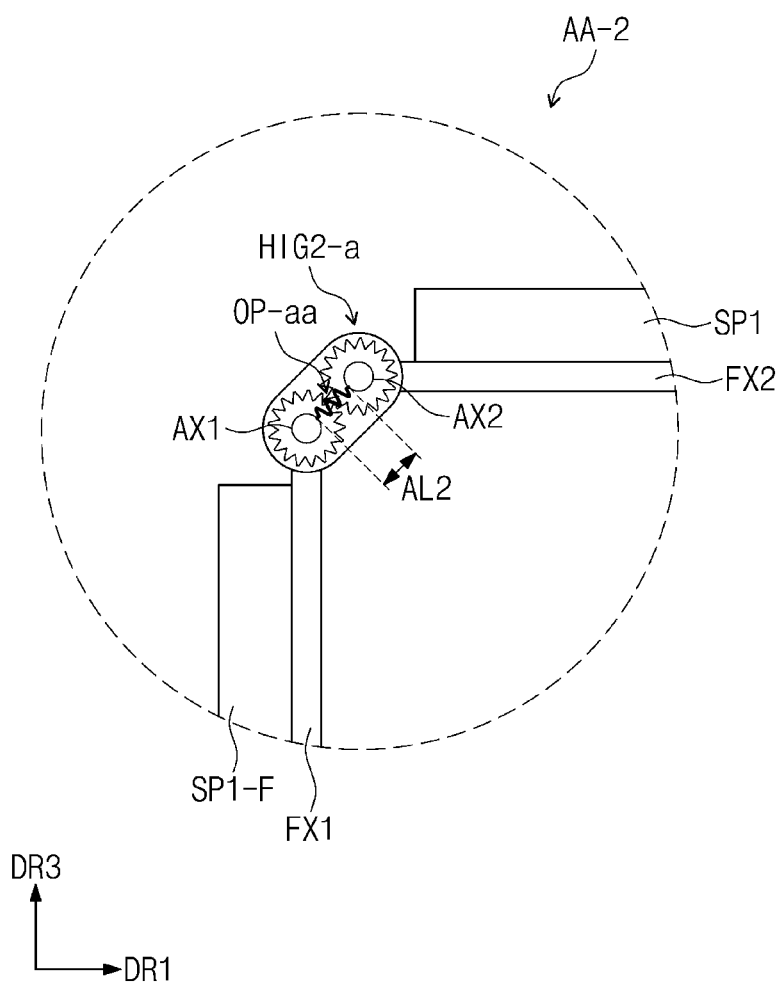
FIG. 12 is a cross-sectional view showing a portion corresponding to region AA-2 of FIG. 10.

FIG. 9 and FIG. 10 are cross-sectional views each showing a portion of a display device according to an exemplary embodiment. FIG. 9 and FIG. 10 show the support parts SP1, SP1-F, and SP2 and hinge parts HIG2-*a* and HIG1. FIG. 9 is a cross-sectional view showing the support parts SP1, SP1-F, and SP2 and the hinge parts HIG2-*a* and HIG1 in a state in which a display device is unfolded. FIG. 9 illustrates the support parts SP1, SP1-F, and SP2 being unfolded so as to be disposed in parallel to each other, and FIG. 10 illustrates the non-folding support parts SP1 and SP2 being folded so as to overlap each other. FIG. 11 is a cross-sectional view showing a portion corresponding to region AA-1 of FIG. 9, and FIG. 12 is a cross-sectional view showing a portion corresponding to region AA-2 of FIG. 10.

Figure 13:
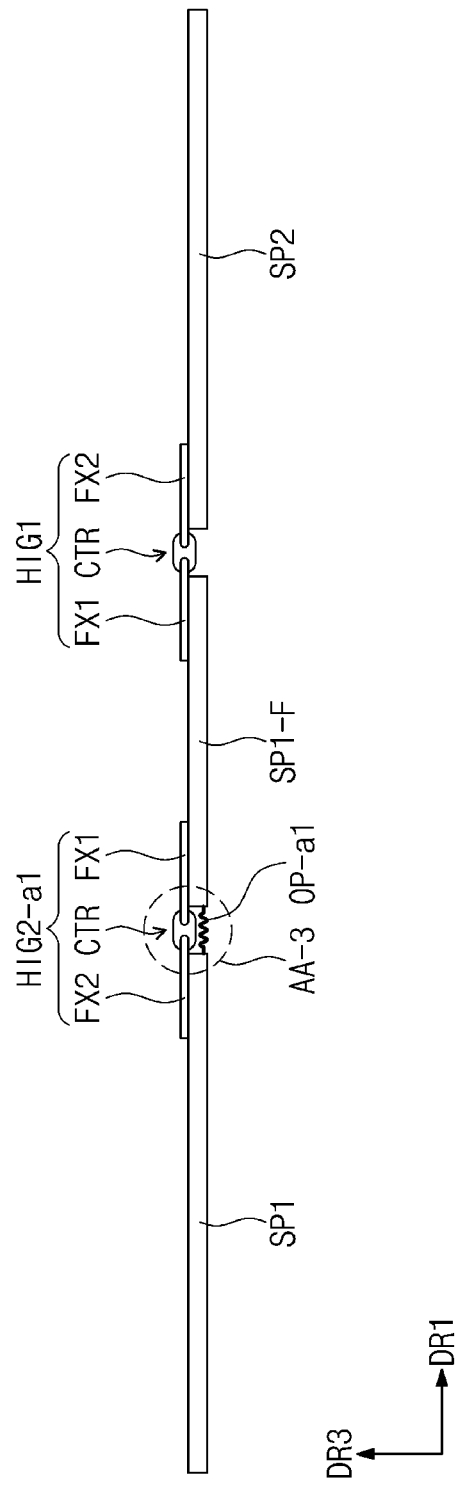
FIG. 13 is a cross-sectional view showing a portion of a display device according to an exemplary embodiment.
Figure 14:
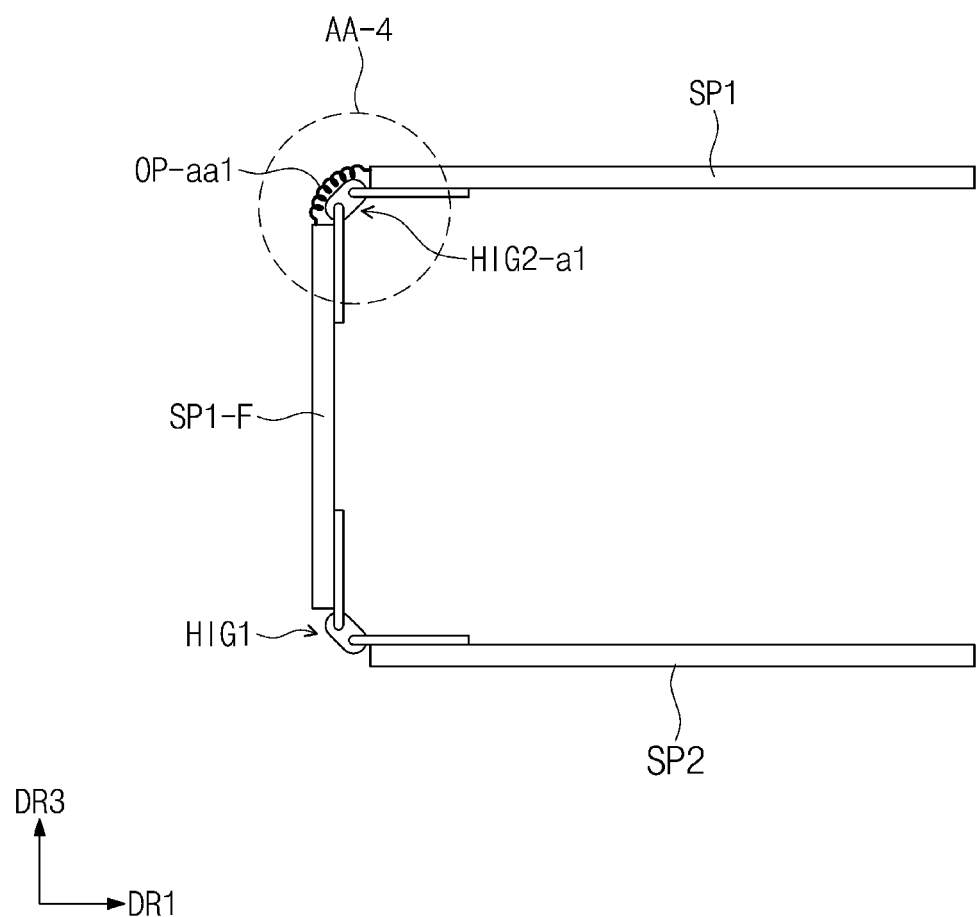
FIG. 14 is a cross-sectional view showing a portion of a display device according to an exemplary embodiment.
Figure 15:
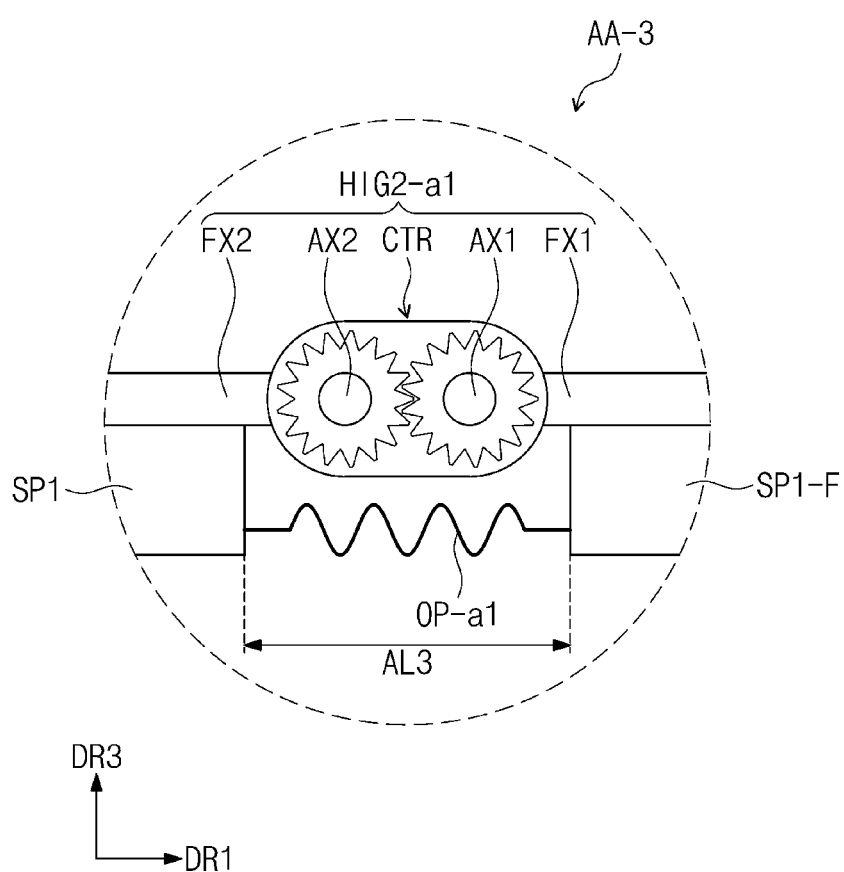
FIG. 15 is a cross-sectional view showing a portion corresponding to region AA-3 of FIG. 13.

FIG. 13 and FIG. 14 are cross-sectional views each showing the support parts SP1, SP1-F, and SP2 and the hinge parts HIG2-*a*1 and HIG1 according to an exemplary embodiment. FIG. 13 illustrates the support parts SP1, SP1-F, and SP2 being unfolded so as to be disposed in parallel to each other, and FIG. 14 illustrates the non-folding support parts SP1 and SP2 being folded so as to overlap each other. FIG. 15 is a cross-sectional view showing a portion corresponding to region AA-3 of FIG. 13, and FIG. 16 is a cross-sectional view showing a portion corresponding to region AA-4 of FIG. 14.

Figure 17:
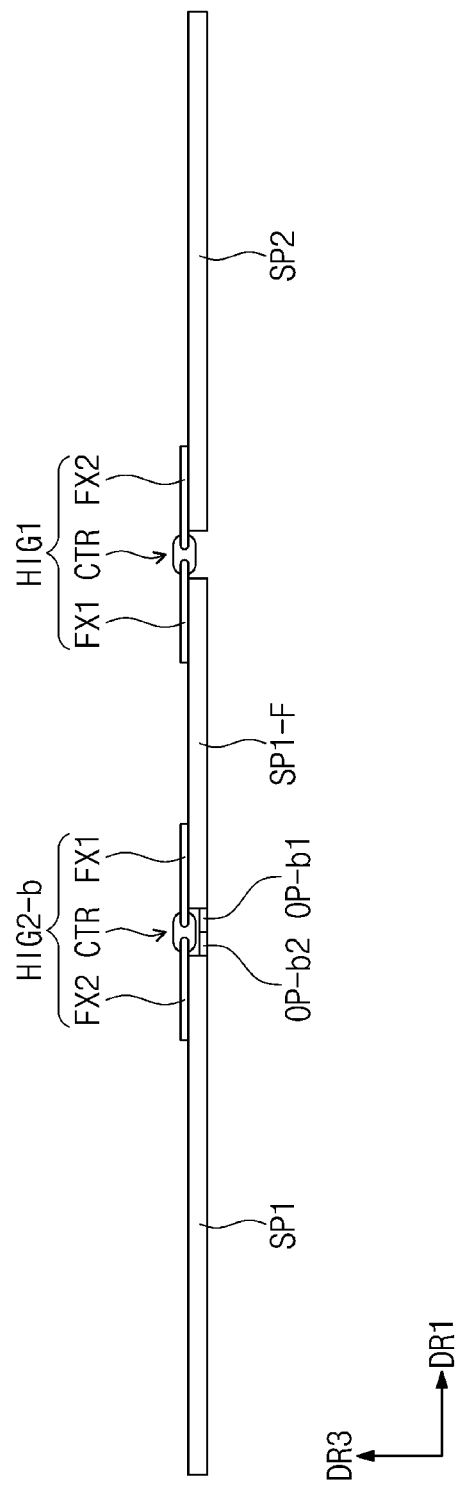
FIG. 17 is a cross-sectional view showing a portion of a display device according to an exemplary embodiment.
Figure 18:
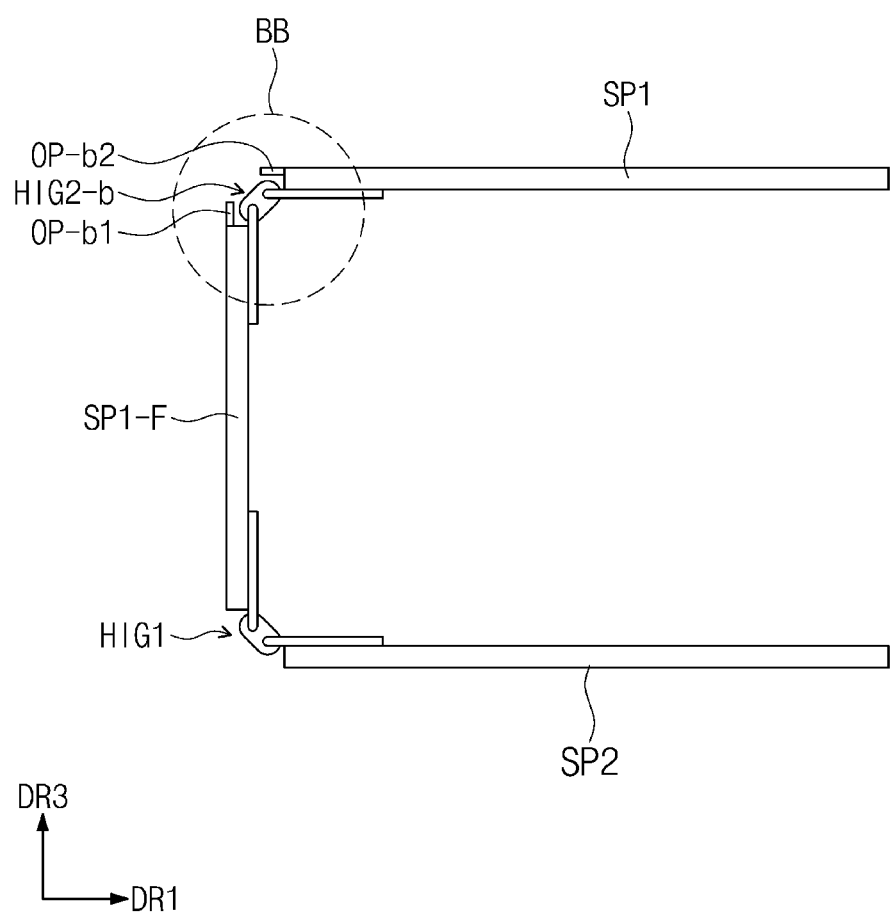
FIG. 18 is a cross-sectional view showing a portion of a display device according to an exemplary embodiment.
Figure 19:
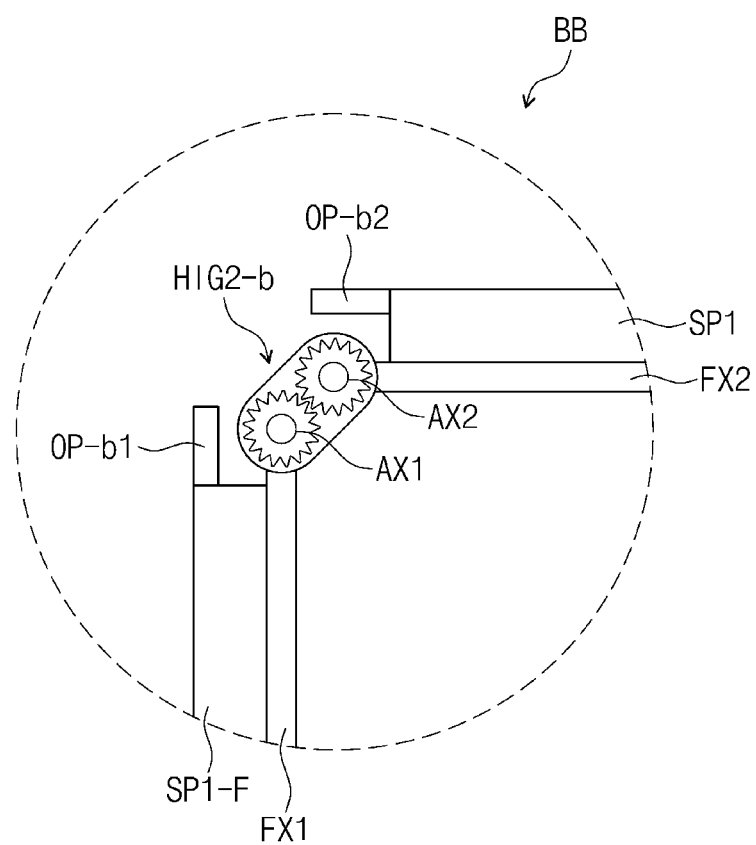
FIG. 19 is a cross-sectional view showing a portion corresponding to region BB of FIG. 18.

FIG. 17 and FIG. 18 are cross-sectional views each showing the support parts SP1, SP1-F, and SP2 and the hinge parts HIG2-*b* and HIG1 according to an exemplary embodiment. FIG. 17 illustrates the support parts SP1, SP1-F, and SP2 being unfolded so as to be disposed in parallel to each other, and FIG. 18 illustrates the non-folding support parts SP1 and SP2 being folded so as to overlap each other. FIG. 19 is a cross-sectional view showing a portion corresponding to region BB of FIG. 18.

Figure 16:
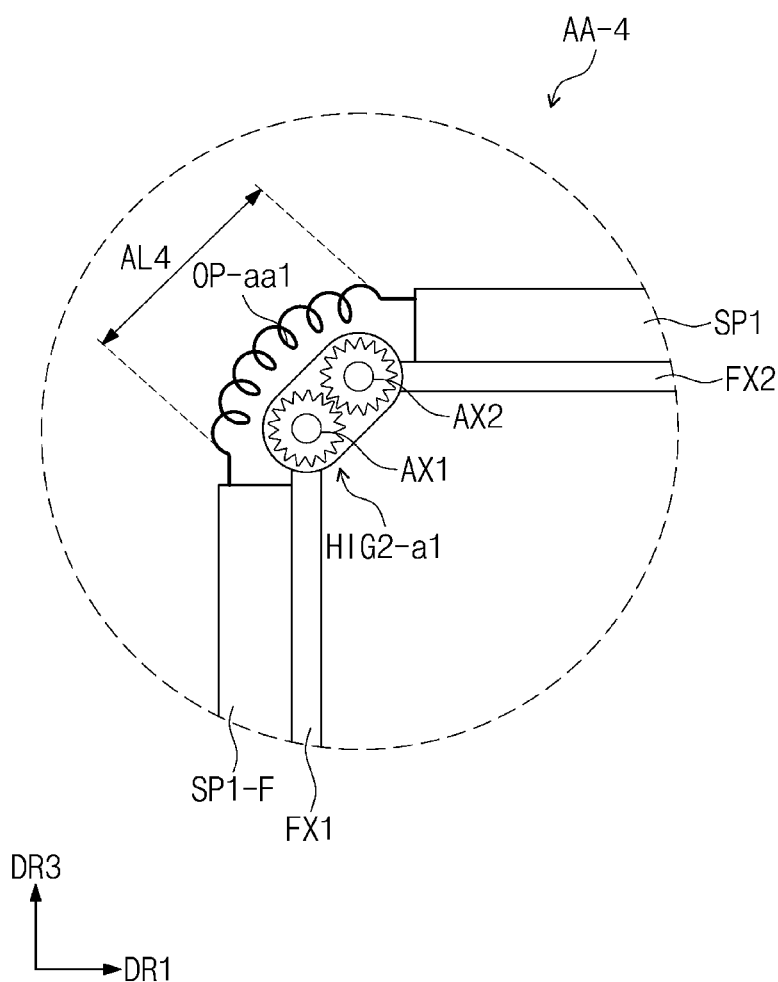
FIG. 16 is a cross-sectional view showing a portion corresponding to region AA-4 of FIG. 14.

Referring to FIG. 11 and FIG. 16, the first adjustment parts OP-a and OP-a1 may be elastic bodies. When the first adjustment parts OP-a and OP-a1 are elastic bodies, the first adjustment parts OP-a and OP-a1 may be substantially the same as the adjustment parts OP-1 and OP-a1 described above, and thus, repeated description thereof will be omitted. Meanwhile, as the first sub-axis AX1 and the second sub-axis AX2 are rotated, the state of the first adjustment part OP-a, which may take the form of a spring or the like, may be varied.

Hereinafter, a first mode may refer that the non-folding support parts SP1 and SP2 are folded to overlap each other, and a second mode may refer that the first non-folding support part SP1, the first folding support part SP1-F, and the second non-folding support part SP2 are unfolded to be disposed in parallel to each other. As such, the state of the first adjustment parts OP-a and OP-a1 may be different in the first mode and in the second mode.

Referring to FIG. 11 and FIG. 12, a length AL2 of the first adjustment part OP-a in the first mode may be different from a length AL1 of the first adjustment part OP-a in the second mode. More particularly, when the non-folding support parts SP1 and SP2 are folded to overlap each other in the first mode, the first sub-axis AX1 and the second sub-axis AX2 may be rotated, and the length of the first adjustment part OP-a connected to the first sub-axis AX1 and the second sub-axis AX2 may be extended.

Referring to FIG. 13 to FIG. 16, the first adjustment part OP-a1 may be disposed under the center portion CTR. The first adjustment part OP-a1 may be connected between the first folding support part SP1-F and the first non-folding support part SP1, and may be positioned under the center portion CTR of the second hinge part HIG2-3S and HIG2-4S.

For example, the first adjustment part OP-a1 may be an elastic body, such as a spring or a rubber band. Referring to FIG. 15 and FIG. 16, a length AL3 of the first adjustment part OP-a1 in the first mode may be different from a length AL4 of a first adjustment part OP-aa1 in the second mode. More particularly, when the first non-folding support part SP1 and the second non-folding support part SP2 are folded to overlap each other in the first mode, the length AL4 of the first adjustment part OP-aa1 may be more extended to the greater extent than the length AL3 of the first adjustment part OP-a1 in the second mode.

In some exemplary embodiments, when an adjustment part is rubber, the length of the rubber in the first mode and the length of the rubber in the second mode may be different. The rubber may be included in the center portion of a hinge part to connect sub-axes, or may be disposed on a lower portion of the hinge part. Similar to the case of a spring described above, the length of the rubber in the first mode may be extended to the greater extent than the length of the rubber in the second mode. However, the inventive concepts are not limited thereto.

Referring back to FIG. 6, the first adjustment parts OP-b1 and OP-b2 according to an exemplary embodiment may be disposed between the first sub-hinge part HIG1-1S and the second sub-hinge part HIG1-2S.

According to an exemplary embodiment, a first opening ON1 may be defined between the first sub-hinge part HIG1-1S and the second sub-hinge part HIG1-2S, and a second opening ON2 may be defined between the third sub-hinge part HIG2-3S and the fourth sub-hinge part HIG2-4S. The first adjustment parts OP-b1 and OP-b2 may be disposed in one of the first opening ON1 and the second opening ON2. For example, the first adjustment parts OP-b1 and OP-b2 may be disposed in the second opening ON2. The first adjustment parts OP-b1 and OP-b2 disposed in the second opening ON2 may be connected to the first folding support part SP1-F and the first non-folding support part SP1.

Meanwhile, the first adjustment parts OP-b1 and OP-b2 may be electromagnets. The first adjustment parts OP-b1 and OP-b2 may include a first sub-electromagnet OP-b1 and a second sub-electromagnet OP-b2. The first sub-electromagnet OP-b1 may be connected to the first folding support part SP1-F, and the second sub-electromagnet OP-b2 may be connected to the first non-folding support part SP1.

Referring to FIG. 17 to FIG. 19, the first sub-electromagnet OP-b1 and the second sub-electromagnet OP-b2 may be spaced apart in the first mode and coupled to each other in the second mode. More particularly, when the non-folding support parts SP1 and SP2 are folded to overlap in the first mode, the first sub-electromagnet OP-b1 and the second sub-electromagnet OP-b2 may be spaced apart from each other. In addition, when the non-folding support parts SP1 and SP2 are unfolded to be disposed in parallel in the second mode, the first sub-electromagnet OP-b1 and the second sub-electromagnet OP-b2 may be coupled.

Figure 20:
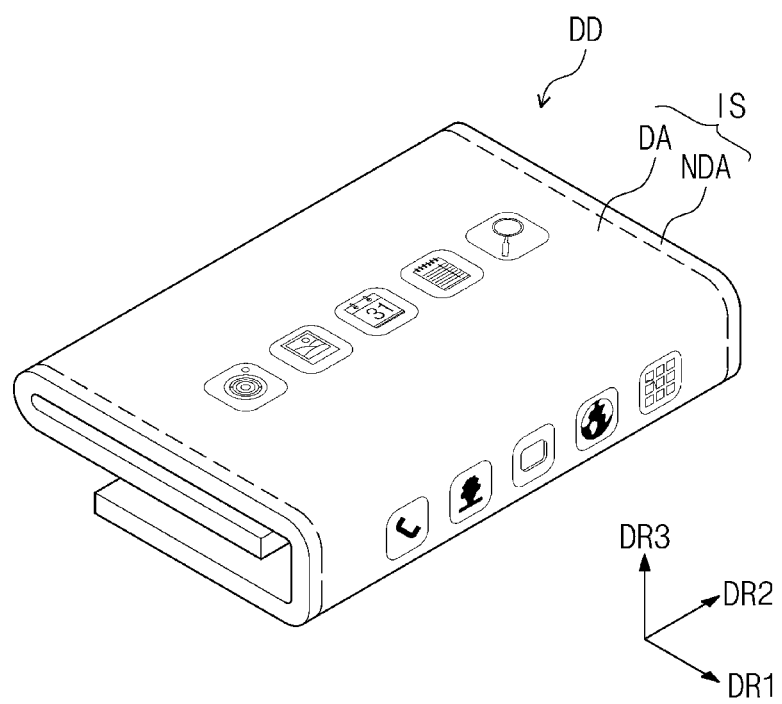
FIG. 20 is a perspective view showing a display device according to an exemplary embodiment.
Figure 21:
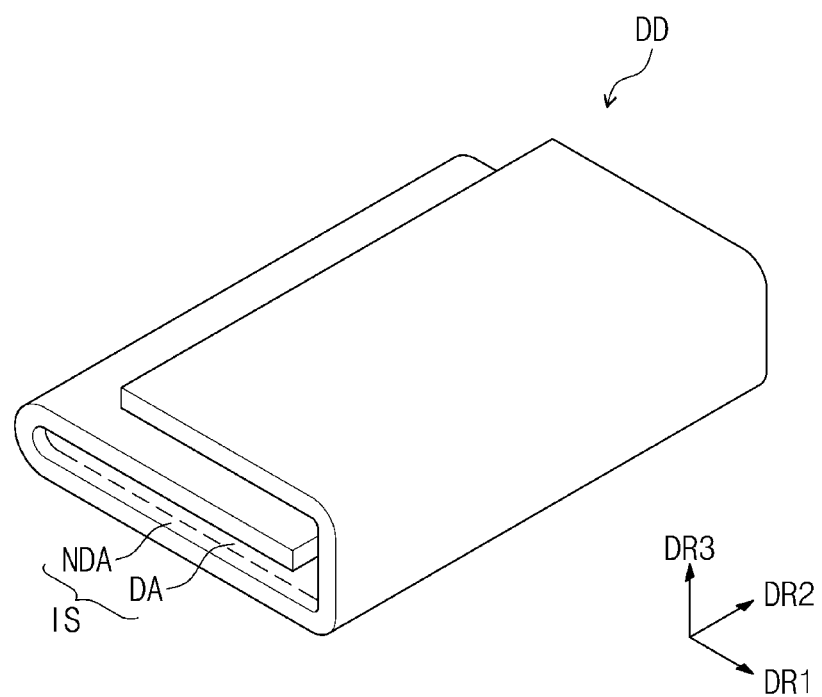
FIG. 21 is a perspective view showing a display device according to an exemplary embodiment.

FIG. 20 and FIG. 21 are perspective views showing the display device DD of FIG. 1 when folded. In FIG. 20, the display device DD is shown to be out-folded, and in FIG. 21, the display device DD is shown to be in-folded. As used herein, out-folded may refer that a display surface is folded to be exposed to the outside, and in-folded may refer that a display surface is folded toward the inside. However, the inventive concepts are not limited thereto, and the folding method may vary.

In FIG. 20 and FIG. 21, a portion to be folded at the time of folding according to an exemplary embodiment is illustrated as having substantially a quadrangular shape, but substantially, may be folded into a shape having curvature. In addition, the area of a folding region may be less than that shown in the drawing.

Figure 22:
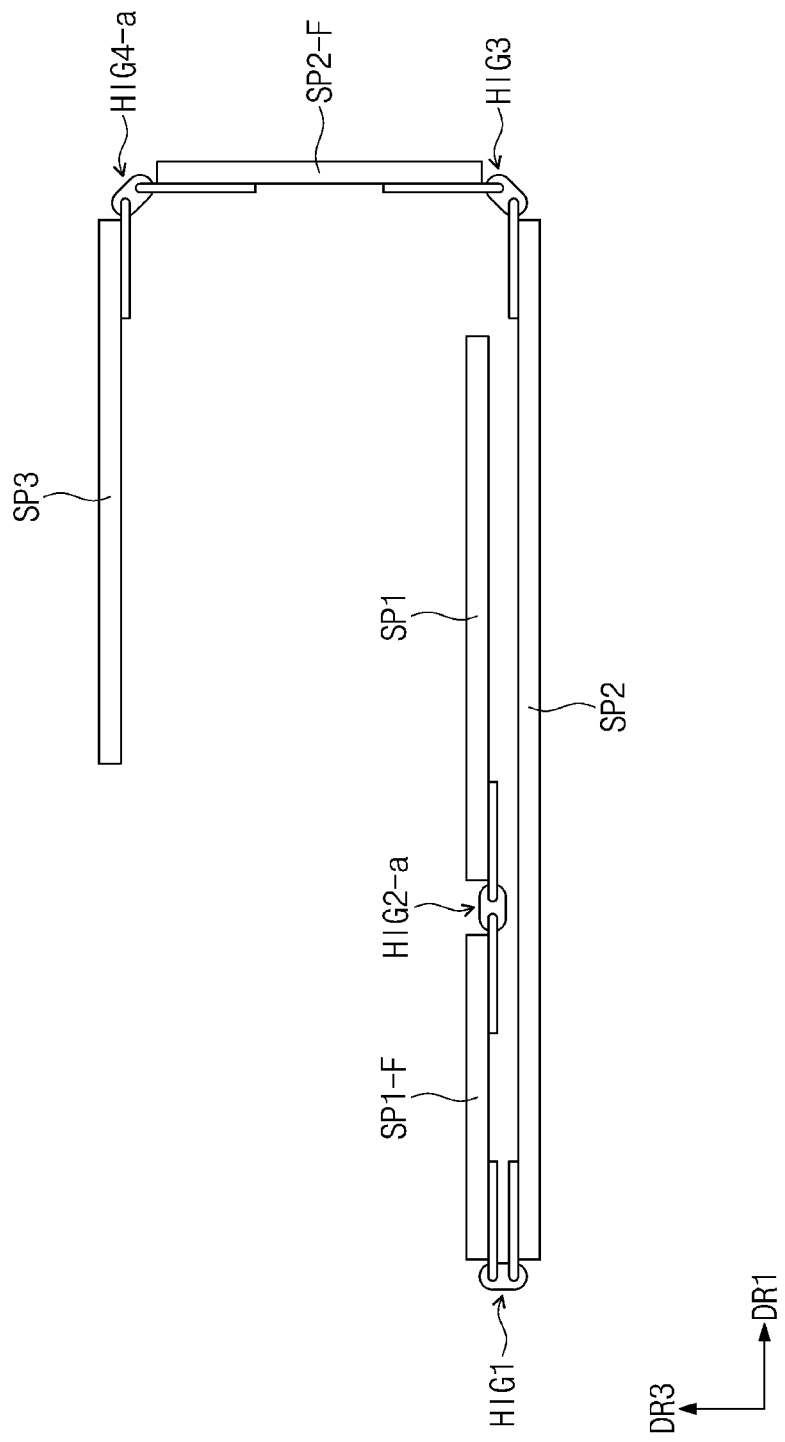
FIG. 22 is a cross-sectional view showing a portion of a display device according to an exemplary embodiment.
Figure 23:
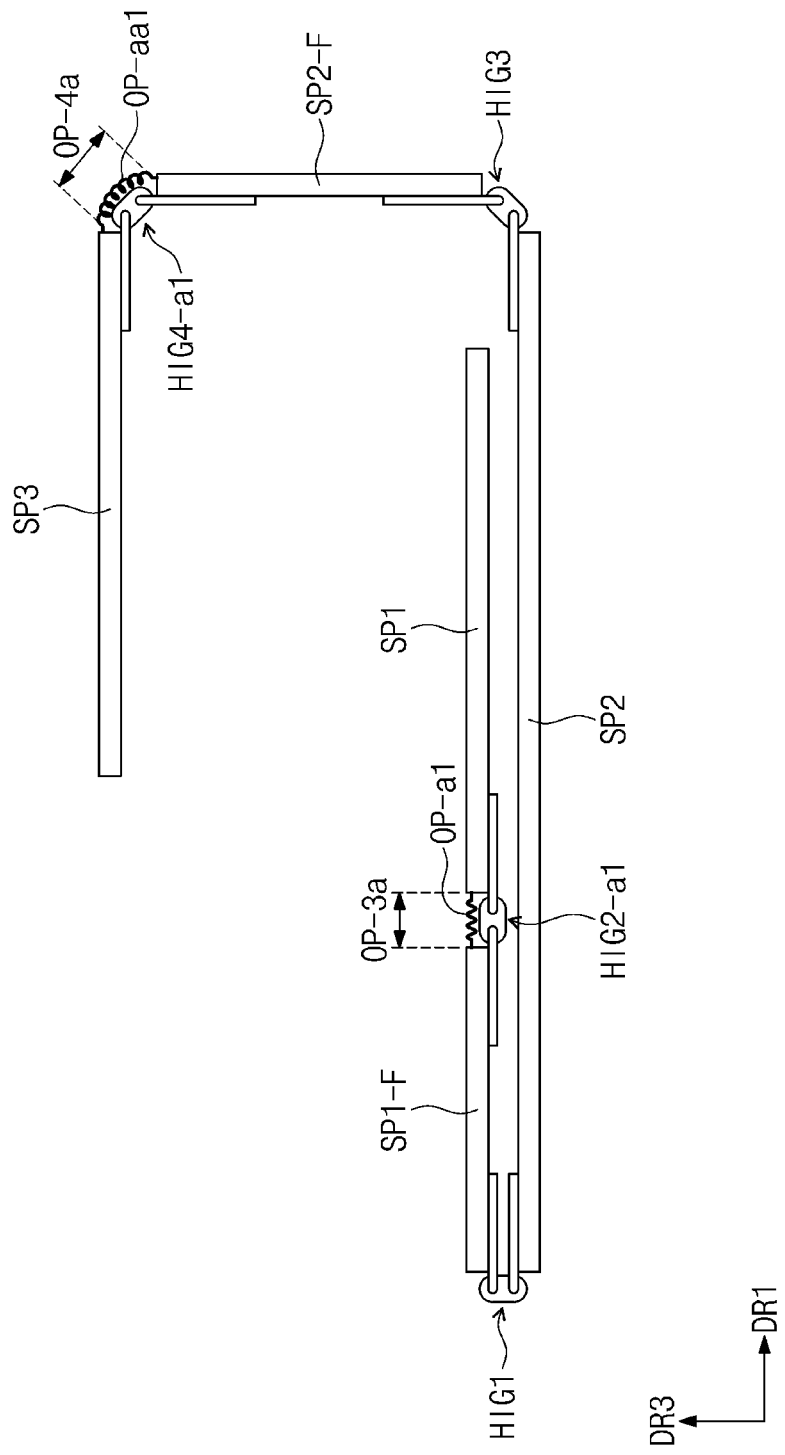
FIG. 23 is a cross-sectional view showing a portion of a display device according to an exemplary embodiment.
Figure 24:
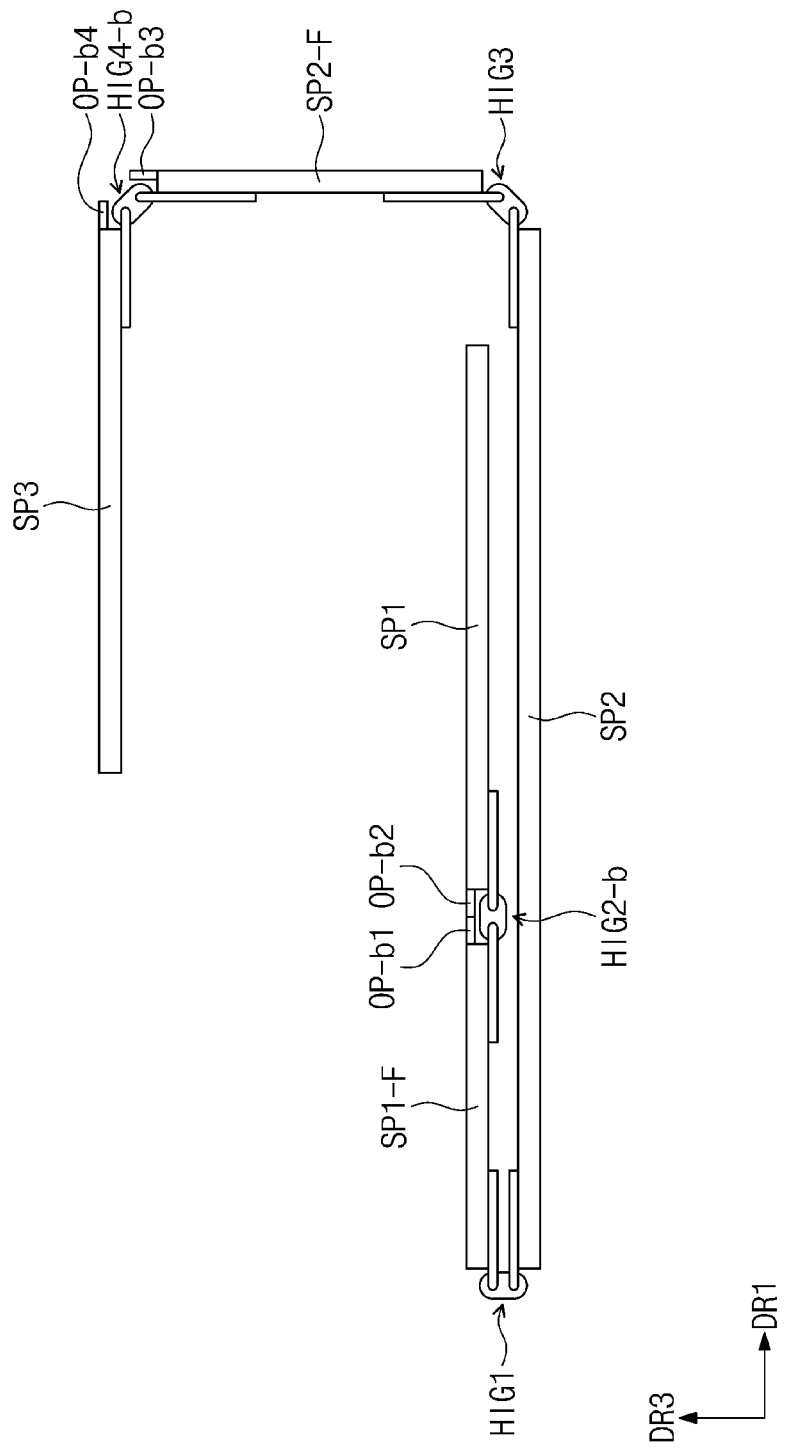
FIG. 24 is a cross-sectional view showing a portion of a display device according to an exemplary embodiment.

FIG. 22 to FIG. 24 are cross-sectional views schematically showing an operation state when the display device DD shown in FIG. 1 and FIG. 2 is folded. In FIG. 22 to FIG. 24, a display module is omitted and only the support parts SP1, SP1-F, SP2, SP2-F, and SP3 are illustrated to show the operation state. Depending on whether in-folded or out-folded, the display module may be exposed to the outside or face each other. When in-folded, the display module may be exposed to the outside, and when out-folded, the display module may face each other.

FIG. 22 to FIG. 24 illustrate the second non-folding support part SP2, the first non-folding support part SP1, and the third non-folding support part SP3 overlapped in this order. When the second non-folding support part SP2, the first non-folding support part SP1, and the third non-folding support part SP3 overlap in this order, the first hinge part HIG1, the third hinge part HIG3, and the fourth hinge parts HIG4-a, HIG4-a1, and HIG4-b may be folded in such order.

Hereinafter, a third mode may refer that the non-folding support parts SP1, SP2, and SP3 are folded such that the non-folding regions NFA1, NFA2, and NAF3 overlap each other, and a fourth mode may refer that the non-folding support parts SP1, SP2, and SP3 are unfolded such that the non-folding regions NFA1, NFA2, and NAF3 are disposed in parallel to each other.

The first hinge part HIG1 to the fourth hinge parts HIG4-a, HIG4-a1, and HIG4-b may respectively connect the support parts SP1, SP1-F, SP2, SP2-F, and SP3, as described above.

A first adjustment part may be disposed between the first folding support part SP1-F and the first non-folding support part SP1, and a second adjustment part may be disposed between the second folding support part SP2-F and the third non-folding support part SP3. The first adjustment part may be disposed adjacent to second hinge parts HIG2-*a*, HIG2-*a*1, and HIG2-*b*, and the second adjustment part may be disposed adjacent to the fourth hinge parts HIG4-*a*, HIG4-*a*1, and HIG4-*b*.

Referring to FIG. 22, the first adjustment part may be included in the second hinge part HIG2-*a*, and the second adjustment part may be included in the fourth hinge part HIG4-*a*. The first adjustment part and the second adjustment part may be located the inside CTR-I (see FIG. 8) the center portion of the hinge parts HIG2-*a* and HIG4-*a*.

According to an exemplary embodiment, when the support parts SP1, SP1-F, SP2, SP2-F, and SP3 are folded to overlap each other, a first state of the first adjustment part and a second state of the second adjustment part may be different from each other. The first state of the first adjustment part may be substantially the same as the state of the first adjustment part OP-a (see FIG. 11) described above in which a length is not extended, and the second state of the second adjustment part may be substantially the same as the state of the second adjustment part OP-aa (see FIG. 12) described above in which a length is extended. The first adjustment part OP-a (see FIG. 11) included in the second hinge part HIG2-*a* which is not folded may be in the first state, in which the length is not extended. The second adjustment part OP-aa (see FIG. 12) included in the fourth hinge part HIG4-*a* which is folded nay be in the second state, in which the length is extended.

In FIG. 23, the first adjustment part OP-a1 is illustrated as being disposed under the second hinge part HIG2-*a*1, and the second adjustment part OP-aal is illustrated as being disposed under the fourth hinge part HIG4-*a*1. The first adjustment part OP-a1 may indicate the first state, and the second adjustment part OP-aal may indicate the second state. A length OP-4*a* of the second adjustment part OP-aal in the second state may be extended to the greater extent than a length OP-3*a* of the first adjustment part OP-a1 in the first state. The length OP-3*a* of the first adjustment part OP-a1 included in the second hinge part HIG2-*a*1 which is not folded, and the length OP-4*a* of the second adjustment part OP-aal included in the fourth hinge part HIG4-*a*1 may be different from each other.

In FIG. 24, the first sub-electromagnet OP-b1 and the second sub-electromagnet OP-b2 are illustrated as being disposed adjacent to the second hinge part HIG2-*b*, and the third sub-electromagnet OP-b3 and the fourth sub-electromagnet OP-b4 are illustrated as being disposed adjacent to the fourth hinge part HIG4-*b*. The first sub-electromagnet OP-b1 and the second sub-electromagnet OP-b2 may be in the first state of being coupled to each other, and the third sub-electromagnet OP-b3 and the fourth sub-electromagnet OP-b4 may be in the second state of being spaced apart from each other. The first sub-electromagnet OP-b1 and the second sub-electromagnet OP-b2 disposed adjacent to the second hinge part HIG2-*b* which is not folded may be in the state of being coupled while facing each other, and the third sub-electromagnet OP-b3 and the fourth sub-electromagnet OP-b4 disposed adjacent to the fourth hinge part HIG4-*b* may be in the state of being spaced apart from each other.

According to an exemplary embodiment, the adjustment parts OP-a, OP-aal, OP-b1, OP-b2, OP-b3, and OP-b4 may be included inside of a plurality of hinge parts HIG2-*a* and HIG4-*a*, or may be disposed adjacent to the hinge parts HIG2-*a*1, HIG2-*b*, HIG4-*a*1, and HIG4-*b* to adjust the folding state of the folding regions FA1 and FA2. The hinge parts HIG1, HIG2-*a*, HIG2-*a*1, HIG2-*b*, HIG3, HIG4-*a*, HIG4-*a*1, and HIG4-*b* respectively coupled to both sides of the folding regions FA1 and FA2 may be folded or unfolded according to the order in which the non-folding regions NFA1, NFA2, and NFA3 overlap. In addition, the state of an adjustment part in a folded hinge part and in an unfolded hinge part may be different from each other. In the folded hinge part, the adjustment part may be deformed such that a folding region is to be easily folded, and in the unfolded hinge part, the adjustment part may be adjusted such that a folding region is not to be folded.

In FIG. 22 to FIG. 24, the second non-folding support part SP2, the first non-folding support part SP1, and the third non-folding support part SP3 are illustrated as overlapping and being folded in this order. However, the inventive concepts are not limited thereto. In some exemplary embodiments, a display device may be folded, such that the second non-folding support part SP2, the third non-folding support part SP3, and the first non-folding support part SP1 overlap in such order, and in this case, a first adjustment part located on the second hinge parts HIG2-*a*, HIG2-*a*1, and HIG2-*b* side may be extended or be spaced apart, and a second adjustment part located on the fourth hinge parts HIG4-*a*, HIG4-*a*1, and HIG4-*b* side may be in a state different from that of the first adjustment part.

For example, when the display device is folded such that the second non-folding support part SP2, the third non-folding support part SP3, and the first non-folding support part SP1 overlap in such order, the third hinge part HIG3, the first hinge part HIG1, and the second hinge parts HIG2-*a*, HIG2-*a*1, and HIG2-*b* may be folded in such order. Unlike in FIG. 22 and FIG. 23, the length of the first adjustment part disposed adjacent to the second hinge parts HIG2-*a* and HIG2-*a*1 may be extended to the greater extent than the length of the second adjustment part disposed adjacent to the fourth hinge parts HIG4-*a* and HIG4-*a*1. Meanwhile, when the first sub-electromagnet OP-b1 and the second sub-electromagnet OP-b2 are disposed adjacent to the second hinge part HIG2-*b*, and when the third sub-electromagnet OP-b3 and the fourth sub-lc) electromagnet OP-b4 are disposed adjacent to the fourth hinge part HIG4-*b*, the first sub-electromagnet OP-b1 and the second sub-electromagnet OP-b2 may be spaced apart from each other, and the third sub-electromagnet OP-b3 and the fourth sub-electromagnet OP-b4 may be coupled to each other.

According to exemplary embodiments, a display device includes two hinge parts disposed under each of a plurality of folding regions, and an adjustment part for controlling the operation of one of the two hinge parts, thereby controlling a folding order.

According to exemplary embodiments, a display device includes an adjustment part for controlling the operation of one of the two hinge parts, thereby freely controlling the order of folding.

According to exemplary embodiments, a display device includes two hinge parts disposed under each of a plurality of folding regions, and an adjustment part for controlling the operation of one of the two hinge parts, thereby controlling a folding order.

According to exemplary embodiments, a display device includes an adjustment part for controlling the operation of one of the two hinge parts, thereby being foldable in any order.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display module including a first folding region, a first non-folding region adjacent to one side of the first folding region, and a second non-folding region adjacent to the other side of the first folding region;
a support member disposed under the display module and including a first folding support part corresponding to the first folding region, a first non-folding support part corresponding to the first non-folding region, and a second non-folding support part corresponding to the second non-folding region;
a first hinge part connecting the first folding support part and the second non-folding support part;
a second hinge part connecting the first folding support part and the first non-folding support part; and
a first adjustment part disposed between the first folding region and the first non-folding region, or between the first folding region and the second non-folding region to control folding of the first folding region,
wherein each of the first hinge part and the second hinge part includes:
a center portion having a first sub-axis and a second sub-axis extending in a first direction;
a first fixing part connecting the center portion and the first folding support part and directly contacting the center portion and the first folding support part; and
a second fixing part connecting the center portion and the first non-folding support part and directly contacting the center portion and the first non-folding support part, or connecting the center portion and the second non-folding support part and directly contacting the center portion and the second non-folding support part.

2. The display device of claim 1, wherein with respect to a virtual center line passing through the center of the second non-folding support part and parallel to the first direction, a distance D1 from the virtual center line to the first hinge part is shorter than a distance D2 from the virtual center line to the second hinge part.

3. The display device of claim 2, wherein the first adjustment part is disposed between the first folding region and the first non-folding region, and the first adjustment part is disposed inside the center portion of the second hinge part or under the second hinge part.

4. The display device of claim 1, wherein the display module and the support member are configured to be folded such that the first non-folding region and the second non-folding region overlap in a first mode, and are configured to be unfolded such that the first non-folding region, the first folding region, and the second non-folding region are disposed in parallel in a second mode.

5. The display device of claim 4, wherein:
the first adjustment part connects the first sub-axis and the second sub-axis of the second hinge part; and
the length of the first adjustment part in the first mode is greater than the length of the first adjustment part in the second mode.

6. The display device of claim 5, wherein the first adjustment part includes an elastic body.

7. The display device of claim 4, wherein:
the first adjustment part is disposed under the center portion of the second hinge part; and
the length of the first adjustment part in the first mode is greater than the length of the first adjustment part in the second mode.

8. The display device of claim 7, wherein the first adjustment part includes an elastic body.

9. The display device of claim 4, wherein:
the first adjustment part is disposed between the first folding region and the first non-folding region;
the first adjustment part includes a first sub-electromagnet attached to the first folding support part side and a second sub-electromagnet attached to the first non-folding support part side; and
the first sub-electromagnet and the second sub-electromagnet are configured to be spaced apart from each other in the first mode, and the first sub-electromagnet and the second sub-electromagnet are configured to be coupled to each other in the second mode.

10. The display device of claim 9, wherein:
the first hinge part includes a first sub-hinge part and a second sub-hinge part spaced apart from each other in the first direction, and the second hinge part includes a third sub-hinge part and a fourth sub-hinge part spaced apart from each other in the first direction;
a first opening is defined between the first sub-hinge part and the second hinge part, and a second opening is defined between the third sub-hinge part and the fourth sub-hinge part; and
the first adjustment part is disposed in the second opening.

11. The display device of claim 1, wherein:
the display module further includes a second folding region adjacent to the second non-folding region, and a third non-folding region adjacent to the second folding region and spaced apart from the second non-folding region;
the support member further includes a third non-folding support part corresponding to the third non-folding region and a second folding support part corresponding to the second folding region; and
the display device further includes a second adjustment part disposed between the second folding region and the third non-folding region to control the folding of the second folding region.

12. The display device of claim 11, further comprising:
a third hinge part connecting the second folding support part and the second non-folding support part; and
a fourth hinge part connecting the second folding support part and the third non-folding support part,
wherein each of the third hinge part and the fourth hinge part includes:
a center portion having a first sub-axis and a second sub-axis extending in the first direction;
a first fixing part connecting the center portion and the second folding support part; and
a second fixing part connecting the center portion and the third non-folding support part.

13. The display device of claim 12, wherein the first adjustment part is disposed adjacent to the second hinge part, and the second adjustment part is disposed adjacent to the fourth hinge part.

14. The display device of claim 11, wherein the display module and the support member are configured to be folded such that the first non-folding region, the second non-folding region, and the third non-folding region overlap in a third mode, and are configured to be unfolded such that the first non-folding region, the second non-folding region, and the third non-folding region are disposed in parallel in a fourth mode.

15. The display device of claim 14, wherein:
each of the first adjustment part and the second adjustment part includes an elastic body;
the length of the second adjustment part is greater than the length of the first adjustment part when the second non-folding region, the first non-folding region, and the third non-folding region sequentially overlap each other; and
the length of the first adjustment part is greater than the length of the second adjustment part when the second non-folding region, the third non-folding region, and the first non-folding region sequentially overlap each other.

16. The display device of claim 14, wherein:
the first adjustment part includes a first sub-electromagnet attached to the first folding support part, and a second sub-electromagnet attached to the first non-folding support part and facing the first sub-electromagnet;
the second adjustment part includes a third sub-electromagnet attached to the second folding support part and a fourth sub-electromagnet attached to the third non-folding support part and facing the third sub-electromagnet; and
the first sub-electromagnet and the second sub-electromagnet are configured to be coupled to each other, and the third sub-electromagnet and the fourth sub-electromagnet are configured to be spaced apart from each other when the second non-folding region, the first non-folding region, and the third non-folding region are sequentially overlapped; and
the first sub-electromagnet and the second sub-electromagnet are configured to be spaced apart from each other, and the third sub-electromagnet and the fourth sub-electromagnet are configured to be coupled to each other when the second non-folding region, the third non-folding region, and the first non-folding region are sequentially overlapped.

17. A display device comprising:
a display module including a first non-folding region, a second non-folding region, and a third non-folding region spaced apart from each other on a plane, a first folding region disposed between the first non-folding region and the second non-folding region, and a second folding region disposed between the second non-folding region and the third non-folding region;
a support member disposed under the display module, and including a first non-folding support part corresponding to the first non-folding region, a second non-folding support part corresponding to the second non-folding region, a third non-folding support part corresponding to the third non-folding region, a first folding support part corresponding to the first folding region, and a second folding support part corresponding to the second folding region;
a first hinge part connecting the second non-folding support part and the first folding support part;
a second hinge part connecting the first folding support part and the first non-folding support part;
a third hinge part connecting the second non-folding support part and the second folding support part;
a fourth hinge part connecting the second folding support part and the third non-folding support part;
a first adjustment part disposed between the first folding region and the first non-folding region; and
a second adjustment part disposed between the second folding region and the third non-folding region,
wherein a first state of the first adjustment part and a second state of the second adjustment part are configured to be different from each other when the display module and the support member are folded such that the first non-folding region, the second non-folding region, and the third non-folding region overlap each other.

18. The display device of claim 17, wherein each of the first adjustment part and the second adjustment part includes an elastic body.

19. The display device of claim 18, wherein:
the length of the second adjustment part is greater than the length of the first adjustment part when the second non-folding region, the first non-folding region, and the third non-folding region sequentially overlap each other; and
the length of the first adjustment part is greater than the length of the second adjustment part when the second non-folding region, the third non-folding region, and the first non-folding region sequentially overlap each other.

20. The display device of claim 18, wherein when the second non-folding region, the first non-folding region, and the third non-folding region sequentially overlap each other:
the first hinge part, the third hinge part, and the fourth hinge part are configured to be sequentially folded; and
the length of the second adjustment part is greater than the length of the first adjustment part.

21. The display device of claim 17, wherein:
the first adjustment part includes a first sub-electromagnet attached to the first folding support part, and a second sub-electromagnet attached to the first non-folding support part and facing the first sub-electromagnet;
the second adjustment part includes a third sub-electromagnet attached to the second folding support part, and a fourth sub-electromagnet attached to the third non-folding support part and facing the third sub-electromagnet; and
the first sub-electromagnet and the second sub-electromagnet are configured to be coupled to each other, and the third sub-electromagnet and the fourth sub-electromagnet are configured to be spaced apart from each other when the second non-folding region, the first non-folding region, and the third non-folding region are sequentially overlapped; and
the first sub-electromagnet and the second sub-electromagnet are configured to be spaced apart from each other, and the third sub-electromagnet and the fourth sub-electromagnet are configured to be coupled to each other when the second non-folding region, the third non-folding region, and the first non-folding region are sequentially overlapped.

22. The display device of claim 21, wherein when the second non-folding region, the first non-folding region, and the third non-folding region sequentially overlap each other:
the first hinge part, the third hinge part, and the fourth hinge part are configured to be sequentially folded; and
the first sub-electromagnet and the second sub-electromagnet are configured to be coupled to each other, and the third sub-electromagnet and the fourth sub-electromagnet are configured to be spaced apart from each other.

23. The display device of claim 21, wherein when the second non-folding region, the third non-folding region, and the first non-folding region sequentially overlap each other:

the third hinge part, the first hinge part, and the second hinge part are configured to be sequentially folded; and the first sub-electromagnet and the second sub-electromagnet are configured to be spaced apart from each other; and the third sub-electromagnet and the fourth sub-electromagnet are configured to be coupled to each other.

* * * * *